United States Patent
Zinser et al.

(10) Patent No.: US 11,440,063 B2
(45) Date of Patent: *Sep. 13, 2022

(54) DIVERTER VALVE FOR CONVEYING MATERIAL TO BE CONVEYED AND METHOD FOR CLEANING A DIVERTER VALVE OF THIS TYPE

(71) Applicant: Coperion GmbH, Stuttgart (DE)

(72) Inventors: Bruno Zinser, Waldburg (DE);
Manfred Schaedler, Ravensburg (DE);
Jochen Sprung, Ravensburg (DE)

(73) Assignee: Coperion GmbH, Stuttgart (DE)

( * ) Notice: Subject to any disclaimer, the term of this patent is extended or adjusted under 35 U.S.C. 154(b) by 70 days.

This patent is subject to a terminal disclaimer.

(21) Appl. No.: 16/588,442

(22) Filed: Sep. 30, 2019

(65) Prior Publication Data
US 2020/0108427 A1 Apr. 9, 2020

(30) Foreign Application Priority Data
Oct. 4, 2018 (DE) .......................... 1020182170347

(51) Int. Cl.
*B08B 9/032* (2006.01)
*F16K 11/083* (2006.01)
*B65G 53/56* (2006.01)

(52) U.S. Cl.
CPC ............ *B08B 9/0322* (2013.01); *B65G 53/56* (2013.01); *F16K 11/0833* (2013.01)

(58) Field of Classification Search
CPC .. F16K 11/0833; F16K 5/0278; F16K 27/062; F16K 1/24; B65G 53/56;
(Continued)

(56) References Cited

U.S. PATENT DOCUMENTS

| 1,329,016 | A |   | 1/1920 | Renkin |              |
|-----------|---|---|--------|--------|--------------|
| 3,687,416 | A | * | 8/1972 | Mueller | F16K 5/0278 |
|           |   |   |        |        | 251/164      |
| 3,720,233 | A | * | 3/1973 | Shur   | F16K 11/0565 |
|           |   |   |        |        | 137/625.17   |

FOREIGN PATENT DOCUMENTS

DE 355796 C 7/1922
DE 102005061432 A1 7/2007
(Continued)

OTHER PUBLICATIONS

German Search Report for DE 10 2018 217 034.7 dated Aug. 12, 2019.
European Extended Search Report for EP 19196900.5 dated Apr. 17, 2020.
Third Party Observation for application No. EP20190196900 dated Jan. 8, 2021.
European Hygienic Engineering & Design Group, EHEDG Glossary, Version 2013/12.G03.
(Continued)

*Primary Examiner* — Michael R Reid
(74) *Attorney, Agent, or Firm* — Wood Herron & Evans LLP

(57) ABSTRACT

A diverter valve for conveying material to be conveyed, the diverter valve being cleanable using a method for CIP cleaning, comprises a housing with at least three passage openings to feed or discharge the material to be conveyed, the passage openings defining a conveying plane. The diverter valve further comprises a rotary part having an axis of rotation and an outer contour designed conically in relation to the axis of rotation at least in sections, the rotary part being arrangeable in the housing in a sealed manner, the rotary part being displaceable along the axis of rotation in an axially driven manner and being arranged such as to be drivable for rotation about the axis of rotation, the axis of rotation being oriented perpendicular to the conveying plane, a passage duct arranged in the rotary part, which—depending on a rotary position of the rotary part—connects in each case two passage openings for conveying material (Continued)

along the passage duct through the diverter valve. The CIP cleaning method of a diverter valve of this type comprises the pulling back and rotating the rotary part into an intermediate position to clean and then dry the diverter valve intensively. A particular feature is the embodiment configured without drainage in the housing of the diverter valve.

8 Claims, 25 Drawing Sheets

(58) Field of Classification Search
CPC ....... Y10G 137/4245; Y10G 137/4336; Y10G 137/4343; Y10G 137/4351
USPC ............... 251/184; 137/238, 244, 245, 245.5
See application file for complete search history.

(56) References Cited

FOREIGN PATENT DOCUMENTS

| | | |
|---|---|---|
| DE | 69935387 T2 | 11/2007 |
| EP | 0994050 B1 | 3/2007 |
| EP | 2322869 B1 | 5/2011 |
| WO | 2017221048 A1 | 12/2017 |

OTHER PUBLICATIONS

Rubber Fab, a Garlock Hygienic Technologies Company, TUF-STEEL®, a Full Line of World Champion Gaskets Product Brochure, Copyright 2016, revised Jan. 2017.

* cited by examiner

DIVERTER VALVE FOR CONVEYING MATERIAL TO BE CONVEYED AND METHOD FOR CLEANING A DIVERTER VALVE OF THIS TYPE

CROSS-REFERENCE TO RELATED APPLICATIONS

This application claims the priority of German Patent Application, Serial No. DE 10 2018 217 034.7, filed on Oct. 4, 2018, pursuant to 35 U.S.C. 119(a)-(d), the content of which is incorporated herein by reference in its entirety as if fully set forth herein.

FIELD OF THE INVENTION

The invention relates to a diverter valve for conveying material to be conveyed and to a method for CIP cleaning of a diverter valve of this type.

BACKGROUND OF THE INVENTION

From DE 10 2005 061 432 A1, a pipe diverter valve with a rotary cock is known, the rotary cock being displaceable in a housing between a conveying position and a cleaning position. The axis of rotation of the cock is arranged in the conveying plane of the pipe diverter valve. The pipe diverter valve can be cleaned using a cleaning and/or rinsing liquid without having to demount the cock from the housing. The pipe diverter valve allows a so-called cleaning-in-place (CIP) cleaning. Owing to the cock being arranged between passage and outlet, a comparatively small cone angle of the cock is obtained, which results in a comparatively long-size cock. Between the long-size cock and the housing of the pipe diverter valve, there is a long gap the sealing of which may be problematic in the conveying position. In order to safely clean a diverter valve of this type, rinsing openings are required to clean all areas in the interior of the diverter valve.

A conveyor pipe diverter valve with a housing and a rotary cock rotatably mounted therein is known from EP 2 332 869 B 1. The conveyor pipe diverter valve allows CIP cleaning. In order to allow CIP cleaning, an elaborate design of the rotary cock and of the housing of the conveyor pipe diverter valve are necessary to ensure a circumferential rinsing gap in all dimensional directions between the rotary cock and the housing. CIP cleaning of said conveyor pipe diverter valve is prone to errors.

EHEDG guideline, document 36 (Transfer systems for dry particulate materials, issue 06/2007) defines implementing provisions for CIP cleaning.

EHEDG guideline, document 41 (Diverter valves in process lines for dry particulate materials, issue 08/2011) describes potential solutions for the hygienic design of conveyor pipe diverter valves.

SUMMARY OF THE INVENTION

It is an object of the present invention to provide a method for the reliable CIP cleaning of a diverter valve for conveying materials to be conveyed.

According to the invention, this object is achieved by a method for cleaning a diverter valve for conveying material to be conveyed, the method comprising the following method steps: terminating the conveying of material to be conveyed, starting the cleaning process, pulling a rotary part axially out of a housing along an axis of rotation, introducing cleaning liquid through at least one passage opening, rotating the rotary part about the axis of rotation while the cleaning liquid is being fed, terminating the feeding of the cleaning liquid, removing the cleaning liquid from the diverter valve, rinsing the diverter valve with a rinsing liquid, terminating the feeding of the rinsing liquid, removing the rinsing liquid from the diverter valve, drying the diverter valve by introducing hot gas, with the rotary part being rotated about the axis of rotation during drying. In another aspect of the invention, this object is achieved by a diverter valve for conveying material to be conveyed and for performing the method according to the invention, the diverter valve comprising a housing with at least three passage openings to feed or discharge the material to be conveyed, the passage openings defining a conveying plane, a rotary part having a rotary axis and an outer contour designed conically at least in sections relative to the axis of rotation, the rotary part being arrangeable in the housing in a sealed manner, the rotary part being displaceable along the axis of rotation in an axially driven manner and being arranged such as to be drivable for rotation about the axis of rotation, the axis of rotation being oriented perpendicular to the conveying plane, and a passage duct arranged in the rotary part, the passage duct connecting, depending on a rotary position of the rotary part, in each case two passage openings to convey material to be conveyed through the diverter valve along the passage duct.

According to the invention, it was found that a diverter valve with a rotary part that is designed conically at least in sections, a defined rinsing gap can be created between the rotary part and the housing by axially displacing the rotary part in a housing along its axis of rotation. A CIP cleaning can be carried out safely. An axial displacement of the rotary part along the axis of rotation by approximately 10 mm, for example, produces a sufficiently large rinsing gap. The rinsing gap is defined as the perpendicular distance of the inside of the housing from an outside of the rotary part. The outside of the rotary part can be defined by the outer contour of the rotary part or by a sealing member protruding therefrom. By axially displacing the rotary part, the diverter valve can be displaced between a conveying position and a cleaning position.

The method according to the invention ensures an improved cleaning of a diverter valve. In particular, the cleaning process can be carried out reliably and, in particular, when the diverter valve is in a closed condition, i.e. with the housing cover mounted. The method allows for CIP cleaning.

According to the method, which comprises the rotation of the rotary part during the feeding of a cleaning liquid, the operation of the diverter valve is improved. As a result of the full contact of the rotary part, in particular in the region of the conical design of the housing inner cone, a radial gap of up to 0 mm is obtained. This means that in this configuration, a gap-free operation is possible. In order to rotate the rotary part, said rotary part is retracted slightly, for example by at most 0.1 mm, from the housing in the axial direction. As a result, a rotary gap of 0.02 mm to 0.2 mm is obtained between the outer contour of the rotary part and the inner contour of the housing. What is important is that the size of the rotary gap is minimal but just sufficient to ensure that the rotary part is rotatable in the housing. The smaller the rotary gap, the smaller the amount of product that will be able to enter the gap. On the other hand, however, a small rotary gap increases the risk that product, which has already deposited in the housing, acts as a mechanical resistance during rotation, causing frictional heat to be generated. When defining the rotary gap, it is necessary to take into account possible product depositions, driving forces and operational safety.

During the feeding of rinsing liquid, the rotary part can be rotated about the axis of rotation and/or it can be moved axially relative to the axis of rotation.

In a third position, the rotary part is axially retracted, for example by up to 40 mm, into a rinsing position. This creates a rinsing gap with a gap width of 0.15 mm to 8.0 mm. To this end, the axial drive, which is in particular configured as a cylinder, receives three defined positions that must be approached.

In the cleaning position, cleaning liquid, rinsing liquid and/or drying gas can be introduced into the diverter valve and discharged from the diverter valve reliably. In particular, a discharge opening allowing liquids to flow out of the housing automatically can be dispensed with. Surprisingly it was found that a discharge opening of this type can be omitted. The design of the diverter valve is rugged and simple. The manufacturing expenditures are reduced. Potential accumulations of dirt caused by an insufficient rinsing of outlets are excluded.

According to the invention, it was found that the cleaning result can be improved by retracting the rotary part from the housing along the longitudinal axis and/or rotating the rotary part about the axis of rotation at least slightly. The rotary part is moved to a so-called central rotary position, which allows for improved cleaning. For this purpose, a rotary drive configured to rotate the rotary part in relation to the housing can be designed with a distinct central position.

In the central rotary position, a passage duct of the rotary part is arranged such as to be out of line with the at least one passage opening. This out-of-line arrangement also comprises intermediate positions arranged outside the duct plane in such a way that a cleaning effect for the diverter valve is still ensured.

In particular, the central position can be approached by the rotary drive in a targeted manner. The central position of the rotary drive is arranged between the two end positions of the rotary drive. The central position is in particular arranged centrally between the two end positions. The central position can also be arranged in an off-center position.

Alternatively, it is conceivable for the central rotary position to be deliberately "passed through" by the rotary drive, allowing cleaning liquid, rinsing liquid and/or drying gas to be fed while the rotary drive "is passing by". In an embodiment of this type, the rotary drive can have a simple design. A distinct intermediate position is not required. In particular, the method can be carried out easily and with reduced time as it is not necessary to stop the rotary drive in the central position.

The rinsing gap is in particular defined in such a way as to ensure that a rinsing liquid fed therein covers and flushes, in other words cleans, all areas of the interior of the housing and of the rotary part. The diverter valve meets the requirements for CIP cleaning. Owing to the rinsing gap being produced actively, a reliable cleaning is ensured. The rinsing gap can be defined in a range from 0.5 mm to 4 mm, in particular in a range between 1.0 mm and 3.0 mm, and in particular between 1.5 mm and 2.0 mm. The rinsing gap is sufficiently large to ensure trouble-free rinsing and cleaning of the diverter valve. Failures caused by an insufficient and/or blocked rinsing gap are excluded. With the method according to the invention, all areas of the housing are cleaned, rinsed and then dried. For this purpose, the gaps are exposed to hot gas, in particular drying air, allowing residual liquid to evaporate and escape from the diverter valve and the entire conveyor system. The hot gas has a temperature of at least 50° C., in particular 60° C., in particular 70° C., in particular 80° C., in particular 90° C., in particular 100° C., in particular 110° C., in particular 120° C., in particular 130° C., in particular 140° C., in particular 150° C. A cleaning liquid may contain detergents, acids, lyes, soaps, surfactants, phosphates and water as well as rinsing fluids and/or solvents. The cleaning liquid may also be a mixture of the ingredients mentioned above. The rinsing liquids are weak lyes or acids to neutralize the liquids and pure water. The hot gas, in particular the drying air, must be filtered sufficiently to prevent germs of any type from developing in the pipe and, therefore, in the diverter valve. In order to sterilize the air, it can also be heated to temperatures much higher than 100° C. The hot gas used to dry the diverter valve is free of germs. It is also conceivable to use dry steam for drying and sterilizing. The temperature of the hot gas is in particular such that the diverter valve is dried reliably while preventing germs from developing and/or seals from being damaged. A corresponding temperature range is in particular between 60° C. and 120° C., in particular 80° C. and 110° C. In exceptional cases, the temperature range may be up to 150° C. Apart from ambient air, other suitable gases such as pure nitrogen and/or pure oxygen for the oxidation of organic ingredients and/or mixtures of oxygen and nitrogen can be used the mixing ratio of which is different from the natural mixing ratio of ambient air, for example 40% of oxygen and 60% of nitrogen. Additionally or alternatively, dry overheated steam or dry air can be used as drying gas. It is advantageous if the drying gas is adapted to absorb moisture, in particular water, and to remove it from the diverter valve.

The housing has at least three passage openings to feed or discharge the material to be conveyed as well as the cleaning liquid and/or the rinsing liquid and/or drying gas, the passage openings defining a conveying plane. In particular, the cleaning liquid and the rinsing liquid are fed into the housing via the same passage opening. The axis of rotation of the rotary part is oriented perpendicular to the conveying plane. This allows the rotation of the rotary part on the one hand and the axial displacement of the rotary part on the other to be distributed among two separate drives. The two drives can be arranged on the rotary part such as to oppose one another in the axial direction of the axis of rotation. This ensures a functional separation of the drives. Furthermore, it is conceivable for the rotary part to be mounted on both sides in relation to the axis of rotation. As a result, the guidance of the rotary movement of the rotary part is improved, in particular more precise. This in particular allows a radial gap of 0.01 mm to 0.5 mm to be defined between the rotary part and the housing in the conveying position. Compared to a pipe diverter valve as claimed in DE 10 2005 061 432 A1 according to which the drive axis of the cock lies in the conveying plane, a greater cone angle is possible when designing the rotary part. This is advantageous for sealing the rotary part in the housing.

According to a particular embodiment, the at least partly conical design of the rotary part along the axis of rotation is restricted to the section in which the passage duct runs. In this embodiment, the rotary part is essentially restricted to the passage duct and the adjoining sealing region. In particular, the rotary part can also be designed conically in sections in relation to the circumference. The rotary part is in particular configured in segments with an opening angle in relation to the axis of rotation, which is smaller than 360°, in particular smaller than 270°, in particular smaller than 225°, in particular smaller than or equal to 200°.

One of the passage openings is a feed opening to feed material to be conveyed into the diverter valve. At least two of the passage openings are discharge openings to discharge the material to be conveyed, in particular selectively, via the one or the other discharge opening. In particular, precisely one feed opening is provided, which is selectively connectable, via the passage duct in the rotary part, to one of the precisely two discharge openings.

In this embodiment, the diverter valve is a distributor valve.

Alternatively, the diverter valve according to the invention can also be used as a collector valve. In the collector valve, at least two of the passage openings serve as feed openings to feed the material to be conveyed into the collector valve. In particular, precisely one discharge opening is provided, which is selectively connectable, via the passage duct in the rotary part, to one of the precisely two feed openings.

The rotary part is arranged in the housing such as to be drivable for rotation about the axis of rotation, in particular in order to define the conveying path through the diverter valve. The rotary part has a passage duct, which—depending on its rotary position about the axis of rotation—connects the at least one feed opening to at least one of the discharge openings in order to convey material to be conveyed. The passage duct extends along a passage duct longitudinal axis oriented in particular linearly and in particular perpendicular to the axis of rotation. The passage duct has two passage duct openings arranged on the conical outer contour of the rotary part. The passage duct openings each have in particular a closed outer contour. The housing geometry has in particular no corners that are difficult to clean. The production of the housing by metal casting is simplified, in particular compared to DE 10 2005 061 432 A1. The rotary part and a housing cover can advantageously be produced from semi-finished products. In particular, the rotary part can be turned from a round material, wherein in particular connecting shafts for connection to an axial drive and a rotary drive are non-detachably connected to the front ends of the round material. In particular, the connecting shafts are welded to the rotary part. In particular, the free ends of the connecting shafts are inserted in front-end recesses on the rotary part and are then welded thereto. The housing cover may for example be made of a thick sheet metal. The rotary part and the housing cover are in particular well suited for hygienic applications of the diverter valve as cracks and cavities in which product might deposit, thus resulting in accumulations of dirt, are avoided.

The rotary part may have recesses and/or breakthroughs, which are not connected to the passage ducts. The recesses and/or breakthroughs are in particular oriented parallel to the axis of rotation, in other words the recesses and/or breakthroughs extend in one direction along the axis of rotation, in particular parallel to the axis of rotation. The recesses and/or breakthroughs may have a round, kidney-shaped, crescent-shaped, circular segment-shaped or oval contour. The contour of the breakthroughs and/or recesses is defined in a plane, which is oriented perpendicular to the axis of rotation. In particular, the contour of the recesses and/or breakthroughs is constant along the breakthrough direction. The recesses and/or breakthroughs can also be configured in the shape of a cone or a double-cone. The double-conical design is essentially in the shape of an hourglass so the cross-sectional surface area of the breakthrough increases towards the front end of the rotary part to improve a discharge of the cleaning liquid. With a double-conical design, the discharge of cleaning liquid is improved. The recesses and/or breakthroughs improve rinsing of the cover areas of the diverter valve. The mass of the rotary part is reduced on account of the recesses and/or breakthroughs.

A method configured such that the speed of the cleaning liquid and/or the rinsing liquid is between 1 m/s and 8 m/s improves the cleaning result.

A method configured such that the hot gas flows through the connected pipelines at a speed of 15 m/s to 40 m/s ensures an improved and in particular faster drying process. The speed in the pipeline should be between 15 m/s and 40 m/s. In the gaps between housing and rotary part, correspondingly higher speeds occur, which remove water or other cleaning and rinsing liquids from the surfaces, in particular completely.

A method configured such that while the cleaning liquid is being introduced, the rotary part is arranged in a rotary central position such that the rotary part faces, with its outer contour, the at least one passage opening, and in particular a passage duct of the rotary part is arranged such as to be out of line with the at least one passage opening, allows the cleaning process to be improved even more. A rotary central position of the rotary part is in particular defined in that the rotary part and the passage duct are arranged out of line with the at least one passage opening. Rinsing agent, cleaning agent and/or drying gas introduced via the at least one passage opening flows immediately against the outer contour of the rotary part into the rinsing gap. As a result of the deflection and/or cross-section reduction, higher flow speeds occur, which lead to an improved cleaning and drying result. In particular, in the rotary central position of the rotary part, parts of the housing can be cleaned, which are otherwise difficult to access.

In particular, the housing has a housing main body with a housing cover detachably connected thereto. The housing cover is in particular fastened to the housing main body using fastening screws. It is advantageous if the inner surface of the housing cover and/or of the housing main body are inclined at least in sections. This assists the automatic outflow of the rinsing liquid.

A housing cover seal is particularly advantageous for CIP cleaning of the diverter valve. The housing cover seal is configured to come in contact with the product, in other words it is accessible for product and rinsing liquid from the interior of the housing. The housing cover seal is arranged without gaps. This prevents product from depositing in a gap, in particular between the housing main body and the housing cover seal or between the housing cover seal and the housing cover, which might in particular allow germs to develop.

An axial drive allows the axial displacement of the rotary part along the axis of rotation. This allows the rotary part to be axially displaced directly in the housing. Owing to the conicity of rotary part and housing, the rinsing gap is obtained immediately. By means of the axial drive, the rotary part can be pressed into the housing with a defined pressure force in order to be arranged in the conveying position. The axial drive is in particular a pneumatic drive with a cylinder. The axial displacement path is obtained from the stroke of the cylinder. The width of the rinsing gap in the cleaning position is obtained from the stroke of the cylinder and from the cone angle. The pneumatic drive has a simple and cost-effective design. Basically, other drives, in particular an electric motor or a hydraulic drive, are also conceivable.

In order to improve the operation of the diverter valve, it is conceivable as well to provide an axially acting pneumatic cylinder with three different target positions. The central position between the two end positions may be changed to rotate the diverter valve without the risk of producing an excess gap between the rotary part and the housing. During cleaning, the central position can also be used to bring about additional movements of the rinsing liquid when the rotary part is being moved back and forth.

A rotary drive for rotatably displacing the rotary part about the axis of rotation, the rotary drive enabling a central position of the rotary part, allows the rotary part to be rotated directly in the housing. The rotary drive is in particular configured as a pneumatic drive. Basically, other drives, in particular an electric motor or a hydraulic drive, are also conceivable.

When the diverter valve is being cleaned, the rotary drive can be used to move the rinsing liquid. When equipped with an electric motor or a hydraulic drive, the rotary part is continuously rotatable through 360° and produces a uniform movement in the rinsing gap. When equipped with a pneumatic rotary drive, the rotary part can be pivoted back and forth to produce additional movements in the rinsing gap.

It is of particular advantage that the axial drive and the rotary drive are designed as separate components. It is conceivable for the two drives to be arranged at the opposing front ends of the housing. The axial drive is in particular arranged at the front end with the greater front surface area of the housing. The separate production and arrangement of the drives result in a simplified design of the diverter valve. Mounting is less difficult and the production costs are reduced. During cleaning and/or switching of the diverter valve, the drives can be moved independently of one another.

In particular, it is advantageous that the rotary part, which is also referred to as rotary cock, can be mounted in the housing on both sides along the axis of rotation. This improves the guiding accuracy and in particular allows a smaller operating gap to be produced between the outer contour of the rotary part and the inner contour of the housing.

A cone angle of the outer contour of the rotary part of between 5° and 80°, in particular between 10° and 40°, in particular between 15° and 25°, ensures a stable operation of the diverter valve. In particular, the risk of self-locking and/or cold welding of the rotary part in the housing is reduced. A radial gap formed between the outer contour of the rotary part and the inner contour of the housing serves to seal the rotary part in the housing. The radial gap in particular amounts to between 0.01 mm and 0.5 mm, in particular between 0.02 mm and 0.3 mm. in particular between 0.03 mm and 0.2 mm, and in particular between 0.05 mm and 0.1 mm. The sealing of the rotary part in the housing by means of the radial gap is also referred to as gap sealing.

Alternatively, the rotary part can also be in direct contact, with its outer contour, with the inner contour of the housing. In particular, the rotary part is in contact, with its conical outer contour, with the inner contour of the housing, which has a corresponding conical inner contour. In this case, there is no radial gap, i.e. it amounts to 0 mm. It is conceivable for the radial gap to be set by its axial positioning along the axis of rotation in the housing and/or to define it as a function of the contact pressure of the rotary part in the housing when moving the rotary part into the housing. It is particularly advantageous if the at least one of the surfaces of housing and rotary part resting against one another has an increased hardness. The housing and the rotary part then form a hard-soft pair in this case. It is also conceivable for the surfaces of housing and rotary part to be hardened. The hardening using a chromium layer is particularly advantageous.

Cone sealing members arranged circumferentially on the rotary part in relation to the axis of rotation, with the passage duct being arranged between the cone sealing members in relation to the axis of rotation, ensure an additional sealing of the rotary part in the housing. In particular, O-rings are used as cone sealing members. O-rings are robust in use and can be used cost-efficiently.

Alternatively, passage duct sealing members arranged circumferentially on the rotary part in relation to a passage duct longitudinal axis can be used to seal the passage duct. The passage duct sealing members are in particular made of an elastomer material. When using the passage duct sealing members, it is advantageous if the radial gap between the outer contour of the rotary part and the inner contour of the housing is larger than the gap seal. When using the passage duct sealing members, the radial gap is 0.2 mm to 2.0 mm, in particular 0.3 mm to 1.2 mm, and in particular between 0.4 mm and 0.8 mm.

The embodiment of the diverter valve configured such that the passage duct sealing members are each retained in a sealing groove of the rotary part in such a way as to be clamped against a surface of the rotary part in particular without gaps, with the passage duct sealing members in particular protruding from the outer contour of the rotary part with a protruding section, with the passage duct sealing member in particular being retained in the sealing groove in a form-fitting manner, ensures a reliable and secure fastening of the passage duct sealing members in sealing grooves of the rotary part. In particular, the passage duct sealing members are each arranged in the sealing grooves in a clamped manner. An inadvertent removal of the passage duct sealing members from the respective groove is excluded.

A sealing groove in which the passage duct sealing members can be held in a form-fitting manner in particular has a dovetailed or trapezoidal design. It is also conceivable for the groove width to increase with increasing groove depth in one direction only. It is advantageous if the passage duct sealing member has an essentially dovetailed or trapezoidal design as well. The contour of the passage duct sealing member has two parallel side edges, which are interconnected by two connecting edges each arranged in an inclined manner. The connecting edges are oriented at a flank angle in relation to the side edges. The flank angle is in particular greater than 45°, in particular greater than 60°, in particular greater than 75°, in particular greater than 80°, in particular greater than 85°, and in particular greater than 88°. In any case, the flank angle is smaller than 90°. A flank angle of 90° would mean that the contour of the sealing groove is rectangular. In the corner areas in which the side edges intersect the connecting edges, the contour of the passage duct sealing member is rounded. In particular, at least one of the corners of the contour is rounded. It is also conceivable for several and in particular all corner areas to be rounded, at least in the section in which the passage duct sealing member is arranged in the sealing groove. Other geometries for the passage duct sealing member and the sealing groove are also conceivable. What is important is that the passage duct sealing member is held in the sealing groove, in particular in the radial direction, in a form-fitting manner. The passage duct sealing member fills most of the groove shape. The passage duct sealing member fills the groove in particular completely. The passage duct sealing member is arranged in the groove without any gaps or dead spaces. The entire surface of the groove is covered by the passage duct sealing member. The passage duct sealing member is in a full surface-to-surface contact with the inner surface of the groove. The passage duct sealing member can be configured as a three-dimensional molded seal or as an essentially two-dimensional flat seal. An inadvertent removal of the passage duct sealing member is prevented. The arrangement of the passage duct sealing member in the sealing groove is reliable.

An in particular circumferential transition chamfer provided on the passage duct sealing member for a smooth transition of the surfaces of the rotary part and the passage duct sealing member ensures a smooth transition of the surfaces of the rotary part and of the passage duct sealing member. The transition chamfer prevents a sharp transition between the surface of the rotary part and the surface of the passage duct sealing member. The transition chamfer is configured, for example, as a straight, inclined surface but it may in particular also have a convex contour, which may in particular also be round, spherical or curved.

In addition or as an alternative to the transition chamfer, the passage duct sealing member may have a transition portion to ensure a smooth transition of the surfaces of the rotary part and of the passage duct sealing member. In particular, the transition portion may be straight at least in sections and in particular be curved at least in sections, in particular be round in sections.

The passage duct sealing member can be arranged in a specially designed O-ring groove which is filled completely by the seal. The sealing groove in particular has no dead spaces. In order to improve the sealing effect, the passage duct sealing member can be configured as an O-ring with a sealing lip formed in one piece therewith and/or with a specially formed sealing contour. The sealing lip may rest against the housing when the rotary part is maximally retracted axially into the housing in an end position. The sealing groove may in particular have rounded transitions and/or round and straight sections in the transition from the rotary part surface to the sealing groove. The passage duct sealing member is in particular complementary to the sealing groove, with the sealing surface thereof protruding from the sealing groove with a protruding section, in other words it protrudes out of the sealing groove.

It is advantageous if the cross-sectional shape of the seal corresponds to the contour of the sealing groove so the sealing groove is filled by the seal in particular completely.

It is advantageous if the rotary movement of the rotary part has an angle of rotation during cleaning, in other words when introducing the cleaning liquid, that is greater than a required angle of rotation to change the position for the rotary part for switching between the passage openings.

It is particularly advantageous if the rotary movement of the rotary part has an angle of rotation greater than 360°.

It is particularly advantageous if the rotary movement and the axial movement of the rotary part are performed at the same time, in other words there is a combined rotary and axial movement. This combined movement is essentially a screw movement. Alternatively, the rotary and axial movements of the rotary part can also be performed sequentially, in particular also in sections, wherein it is not necessary to define the order of the sequence. What is important is that the rotary part is transferred from an operating position, in which the passage duct is defined between two passage duct openings, into a cleaning position, which may require rotary and/or axial movements of the rotary part.

When rotating the rotary part into an intermediate position, both passage openings can be rinsed in particular at the same time, with the rotary part at the same time being displaced axially into the rinsing position.

Exemplary embodiments of the invention will hereinafter be explained in more detail by means of the drawing.

DESCRIPTION OF THE PREFERRED EMBODIMENTS

Figure 1:
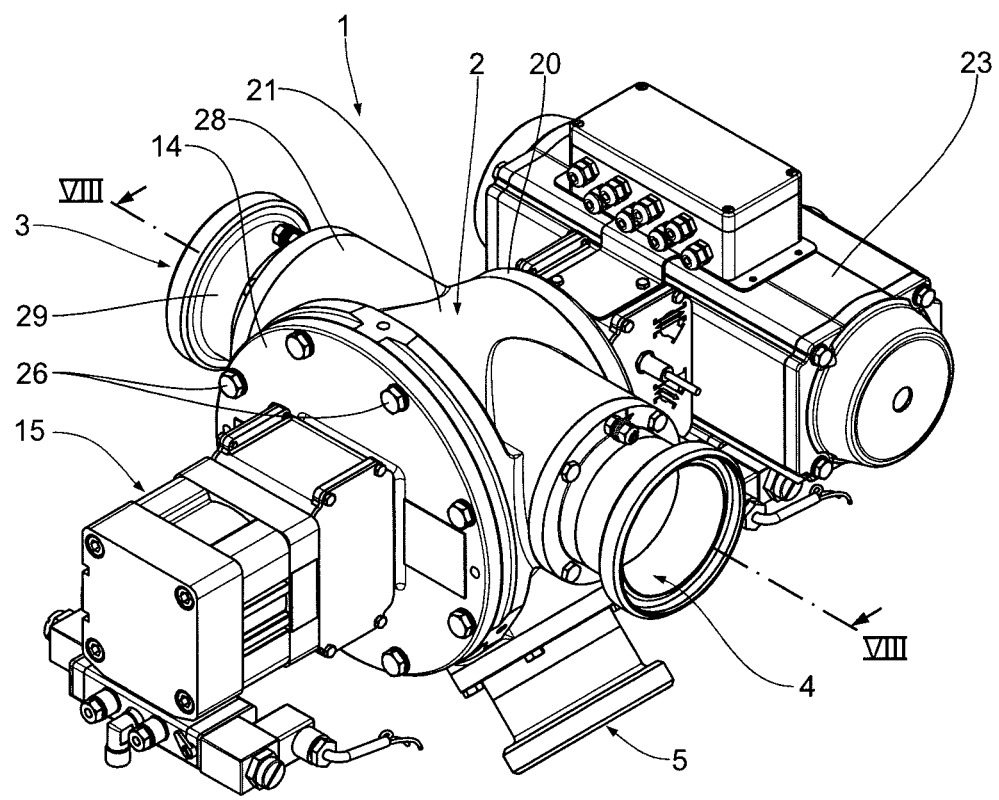
FIG. 1 shows a perspective view of a three-way diverter valve.
Figure 2:
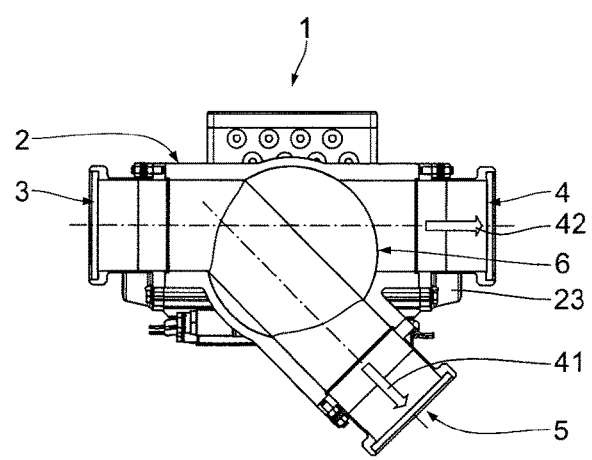
FIG. 2 shows a simplified principle view of the installation of the diverter valve with a horizontal passage direction and an outlet towards the bottom.

A diverter valve 1 shown in FIG. 1 to FIG. 11 serves to convey material to be conveyed. The material to be conveyed is for example bulk material, in particular particulate and/or powdery material such as plastic pellets or particulate and/or powdery food. The bulk material is conveyed in particular pneumatically. The material to be conveyed can also be a pasty mass and/or liquid, in other words a fluid.

The diverter valve 1 is configured as a three-way diverter valve. The diverter valve 1 has a housing 2 provided with a first passage opening 3, a second passage opening 4 and a third passage opening 5. The passage openings 3, 4, 5 serve to feed and/or discharge the material to be conveyed. The passage openings 3, 4, 5, in particular the central lines of the passage openings 3, 4, 5, define a conveying plane.

A rotary part 6 is arranged in the housing 2. The rotary part 6 has an axis of rotation 7 oriented perpendicular to the conveying plane. The rotary part 6 is arranged in the housing 2 such as to be axially displaceable along the axis of rotation 7. The initial adjustment of the gap between the outer contour 9 of the rotary part 6 and the inner contour 17 of the housing 2 is performed by setting the axial position of the rotary part 6 in the housing 2. In the embodiment shown, said gap adjustment is performed using a threaded sleeve 32, which enables an infinitely variable, in other words continuous axial displacement of the rotary part 6 in the housing 2 from outside the housing 2 by means of a tool, for example. The rotary part 6 is arranged in the housing 2 such as to be rotatable about the axis of rotation 7.

The rotary part 6 has a passage duct 8. The rotary part 6 is in particular arrangeable in an outlet arrangement shown in FIG. 9 in which the first passage opening 3 is directly connected to the third passage opening 5 via the passage duct 8. In the outlet arrangement, the second passage opening 4 is sealed by the rotary part 6. In other words, the three-way diverter valve 1 ensures that in the outlet arrangement, the passage openings 3, 5 are connected to each other to allow material to be conveyed along an outlet direction 41 while the passage opening 4 is shut off by the rotary part 6.

Figure 10:
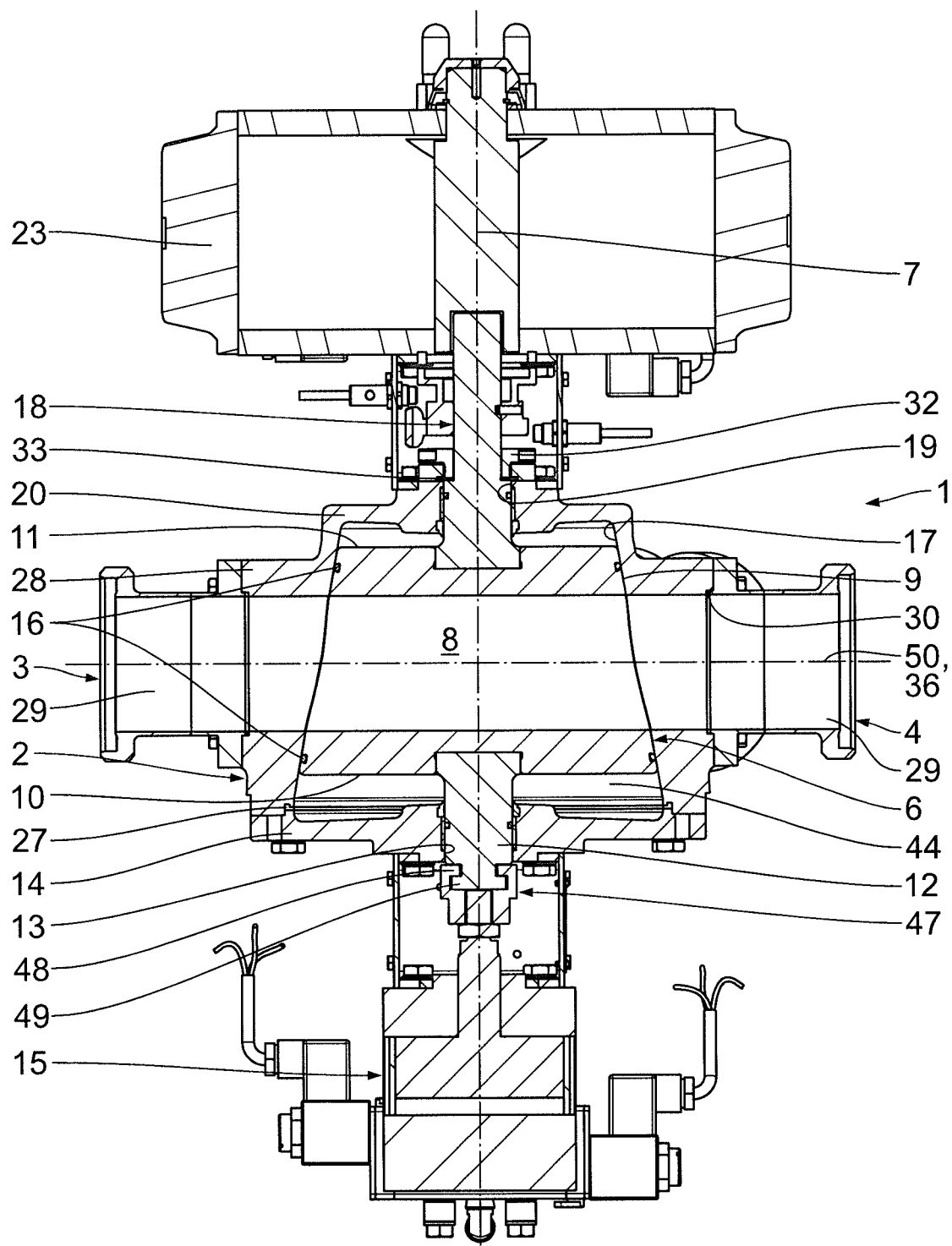
FIG. 10 shows a longitudinal sectional view, relative to the conveying direction, of the diverter valve in the passage arrangement.

Correspondingly, FIG. 10 shows a passage arrangement in which the first passage opening 3 is connected to the second passage opening 4 via the passage duct 8 to convey material along a passage direction 42. The passage direction 42 is linear between the first passage opening 3 and the second passage opening 4. The first passage opening 3 and the second passage opening 4 are arranged essentially opposite, in particular diametrically opposite, one another on the housing 2. The third passage opening 5 is sealed by the rotary part 6. The outlet direction 41 from the first passage opening 3 to the third passage opening 5 is arranged at an outlet angle β in relation to the passage direction 42 between the first passage opening 3 and the second passage opening 4. In the exemplary embodiment shown, the outlet angle β is 45°. It is advantageous if the outlet angle β is between 30° and 90°, in particular between 40° and 60°, and in particular between 42° and 50°.

Figure 6:
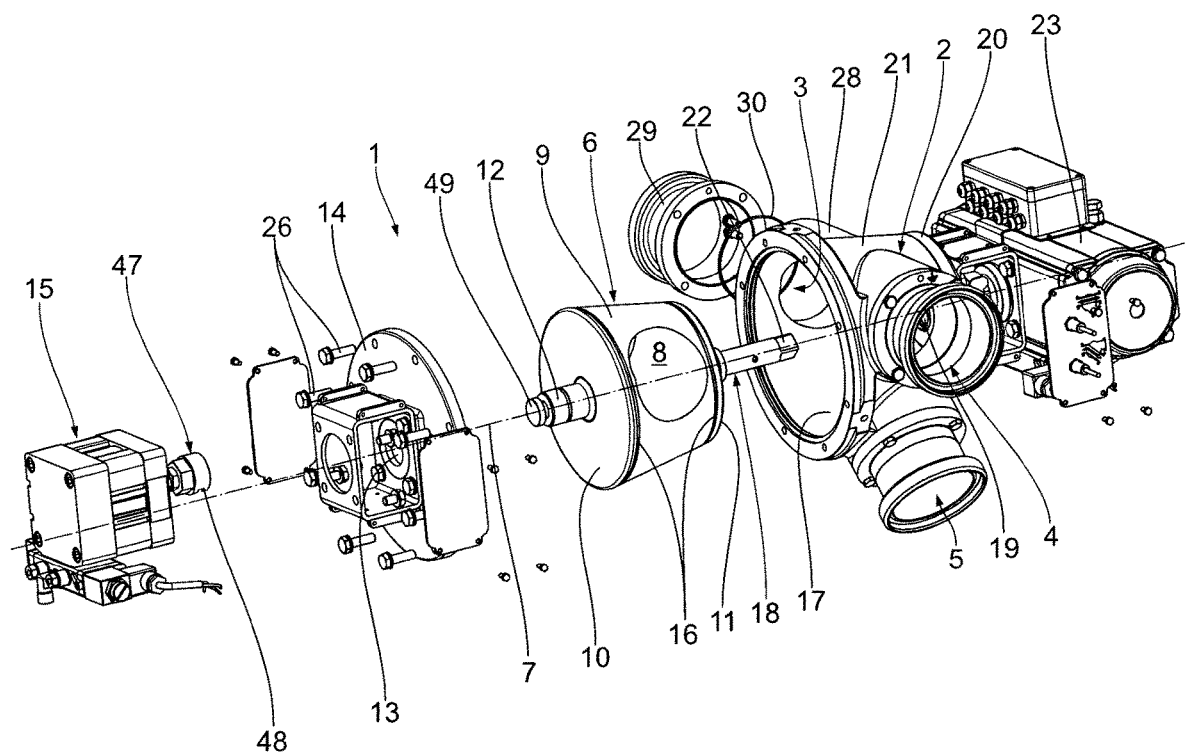
FIG. 6 shows an exploded view of the diverter valve in FIG. 1.
Figure 7:
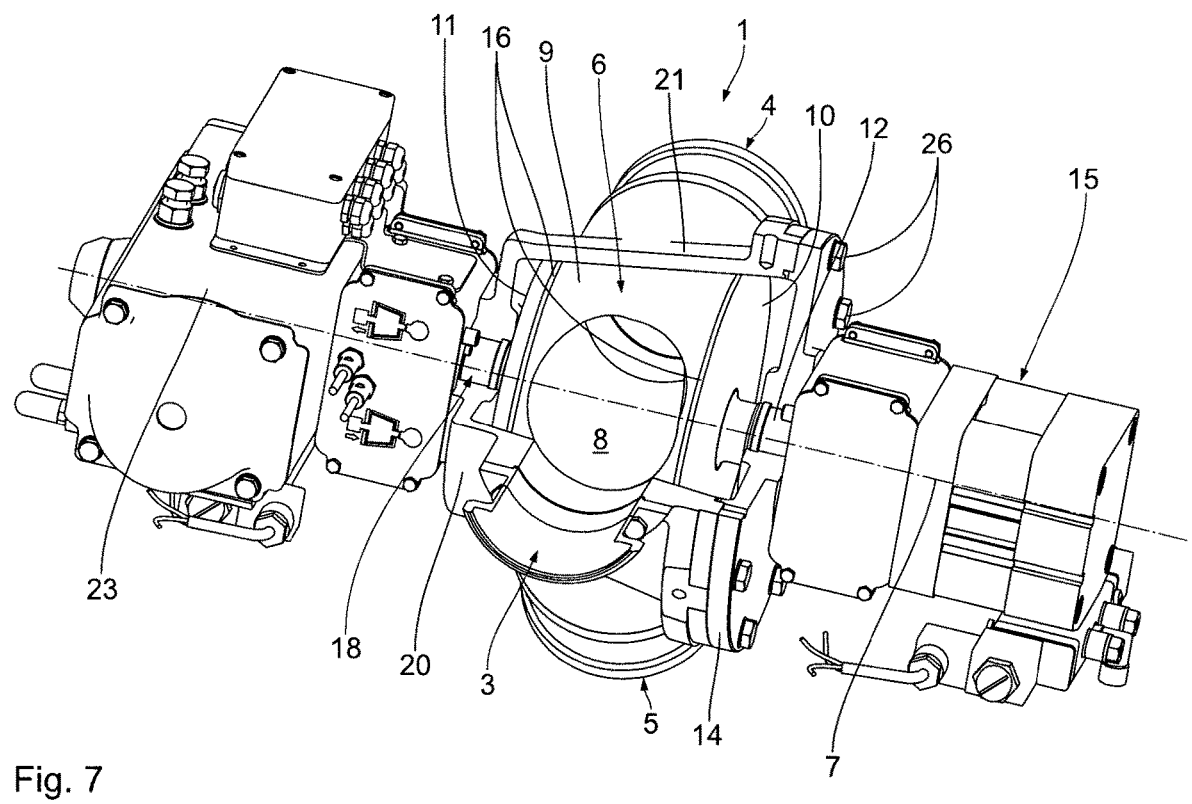
FIG. 7 shows another perspective view of the diverter valve as shown in FIG. 1, the housing being shown in a partly cut view.

The rotary part 6 is configured essentially frustoconically in relation to its axis of rotation 7, in other words it has a conical outer contour 9 at least in sections along the axis of rotation 7. In the illustration of FIG. 6, the axis of rotation is the explosion axis. The passage duct 8 is oriented perpendicular to the axis of rotation 7. The passage duct is arranged eccentrically on the rotary part 6 in relation to the axis of rotation 7.

The frustoconical geometry of the rotary part 6 is defined by a larger front end face 10 and a smaller front end face 11. In the exemplary embodiment shown, the front end faces 10, 11 are each oriented perpendicular to the axis of rotation 7 and configured in a planar manner. Also, the front end faces 10, 11 may each have a convex shape and in particular be inclined and/or curved at least in sections.

On the larger front end face 10, an axial drive shaft 12 is fastened to the rotary part 6. The axial drive shaft 12, which is guided out of the housing 2 via a first opening 13 in a housing cover 14, is connected to an axial drive 15 via a coupling 47. The axial drive 15 is configured as a pneumatic drive, in particular a pneumatic cylinder, in particular as a lift drive. The axial drive 15 may also be configured as an electric motor or as a hydraulic cylinder. The axial drive 15 enables a driven axial displacement of the rotary part 6 in the housing 2 along the axis of rotation 7. The axial drive 15 can be designed such as to have an intermediate position, which allows the rotary part 6 to be displaced in the housing 2 along the axis of rotation 7 into an axial intermediate position. In the axial intermediate position of the rotary part 6 in the housing 2, the diverter valve 1 can be operated and/or rotated with a small gap of between 0.01 mm and 0.5 mm.

The coupling 47 provides a connection, directed in the axial direction of the axis of rotation 7, between the axial drive 15 and the axial drive shaft 12 in order to transmit axial forces. The coupling 47 is free of torque in relation to the axis of rotation 7. A rotary movement of the rotary part 6 is not transmitted to the axial drive 15 by the coupling 47. To this end, the coupling 47 of the exemplary embodiment shown has a sleeve-shaped design with an annular collar 48 facing the axial drive shaft 12 and directed radially inwardly. In the axial direction of the rotary axis 7, the annular collar 48 engages behind an annular disc section 49 of the axial drive shaft 12. The annular disc section 49 is arranged rotatably in the sleeve section of the coupling 47. The annular disc section 49 is formed in one piece with the axial drive shaft 12 and is arranged at the front end of the axial drive shaft 12.

The rotary part 6 is provided with two cone sealing members 16, which are arranged on the rotary part 6 such as to be spaced from one another in relation to the axis of rotation 7. According to the exemplary embodiment shown, the cone sealing members 16 are each configured as O-rings. The cone sealing members 16 serve to seal the cone surface, in other words the conical outer contour 9, against the corresponding inner contour 17 of the housing 2.

The cone sealing members 16 are each arranged adjacent to the larger front end face 10 or the smaller front end face 11, respectively. In particular, the passage duct 8 is arranged along the axis of rotation 7 between the two cone sealing members 16.

Figure 8:
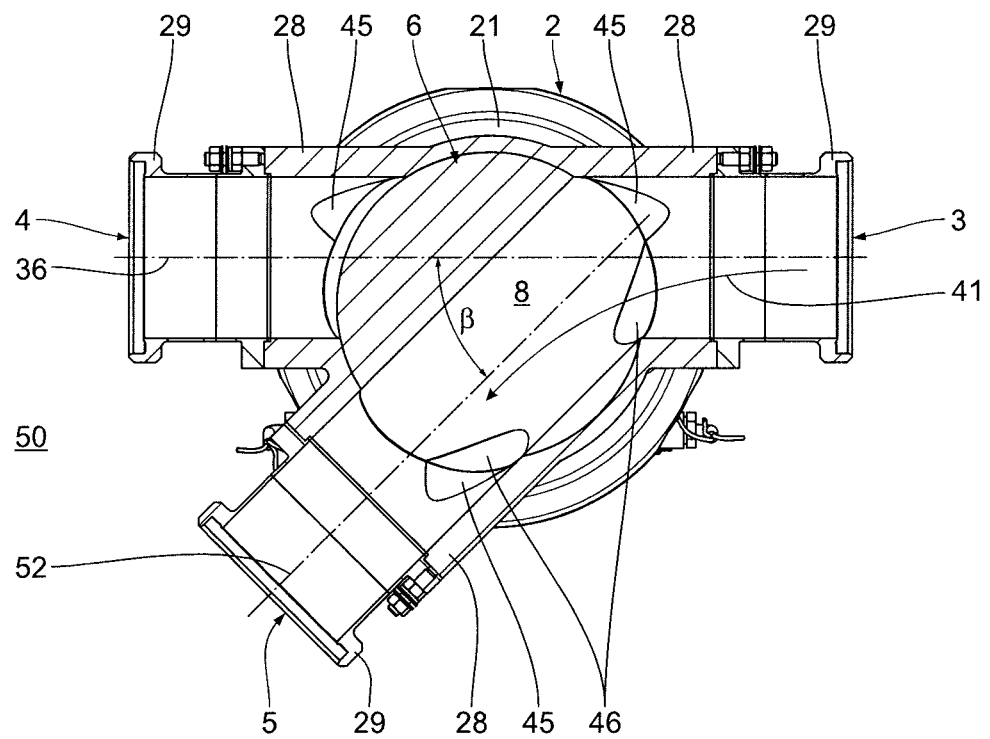
FIG. 8 shows a sectional view along section line VIII-VIII in FIG. 1 with the diverter valve in an outlet arrangement.
Figure 9:
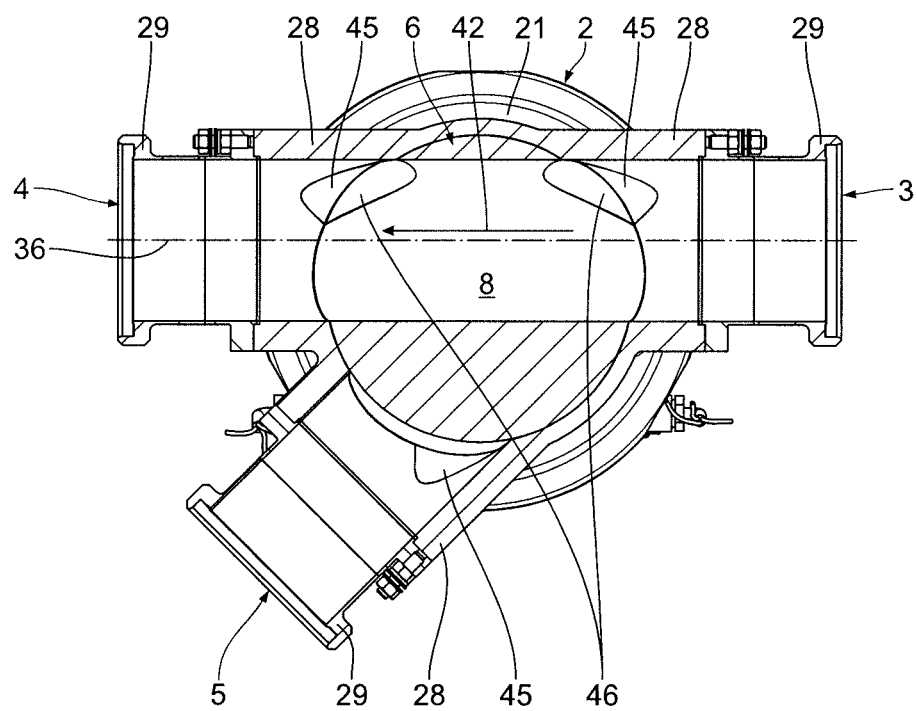
FIG. 9 shows a sectional view, corresponding to FIG. 8, of the diverter valve in a passage arrangement.

On the smaller front end face 11, a rotary drive shaft 18 is fastened to the rotary part 6, which is in particular formed in one piece with the housing main body 21, said rotary drive shaft 18 being configured to be guided out through a second opening 19 in the housing bottom 20. The rotary drive shaft 18 has a torque transmitting section 22 at least in sections along the axis of rotation 7, said torque-transmitting section 22 being non-round in the plane perpendicular to the axis of rotation 7 and having an external square geometry in the exemplary embodiment shown. By means of the torque transmitting section 22, the rotary drive shaft 18 can be coupled to a rotary drive 23 in a torque-transmitting manner. The rotary drive 6 can be driven in the housing 2 for rotation in relation to the axis of rotation 7. The rotary drive 23 is configured as a pneumatic rotary drive. The rotary drive 23 can also be configured as an electric motor, hydraulic motor or hydraulic cylinder. The rotary drive 23 enables a rotation of the rotary part 6 between the outlet arrangement as shown in FIG. 8 and the passage arrangement as shown in FIG. 9.

Pocket-shaped recesses 45 are provided on the inner surfaces of the housing 2, in particular in the connecting sockets 28 associated to the passage openings 3, 4, 5. The recesses 45 each interact with a corresponding freeform surface 46 in the passage duct 8 of the rotary part 6. The pocket-shaped recesses 45 in the housing 2 are non-symmetrical in relation to a longitudinal center plane 50 spanned by the axes 36, 52 of the passage openings 3, 4, 5. The longitudinal center plane 50 corresponds to the drawing plane as shown in FIGS. 8 and 9. In particular in the outlet arrangement shown in FIG. 8 but also in the passage arrangement shown in FIG. 9, a transition to the passage duct is free of edges, in other words free of joints. A geometric joint is avoided by adapting the contours in the connecting sockets 28 and in the passage duct 8. Further details concerning the joint-free design can be found in DE 39 22 240 C2.

The housing cover 14 is screwed to the housing main body 21 using several fastening screws 26. The housing cover 14 is sealed against the housing main body 21 by means of a circumferential annular seal 27. The annular seal 27 is a housing cover seal. The annular seal 27 is freely accessible from an interior of the housing 2 of the diverter valve 1. The annular seal 27 is configured to come into contact with product. The annular seal 27 enables wet cleaning of the housing 2 without having to open the housing 2 in order to do so. The diverter valve 1 can be cleaned in a closed condition using a liquid. The diverter valve 1 allows liquid cleaning to be carried out to comply with Cleaning-in-Place hygiene requirements.

The outer contour 9 of the rotary part 6 is designed with the cone angle κ in relation to the axis of rotation 7. In the exemplary embodiment shown, the cone angle κ is 20°. It is advantageous if the cone angle κ is between 50° and 80°, in particular between 10° and 40°, in particular between 15° and 25°.

The passage openings 3, 4, 5 are each provided with connecting sockets 28 formed in one piece with the housing main body 21, the connecting sockets 28 allowing a simpler and improved connection of conveyor lines to the housing 2. In an advantageous embodiment, a pipe socket 29 sealed by means of a flange seal 30 coming in contact with the product can be flanged to each of the connecting sockets 28. The pipe sockets 29 provide a standardized connection interface to integrate the diverter valve 1 into a conveyor system. The pipe sockets can easily be screwed to the housing. This allows the diverter valve 1 to be adapted to the required pipe-cross-section of a conveyor system by a suitable selection of the pipe sockets 29. The diverter valve 1 can be integrated into an existing conveyor system in a flexible and uncomplicated manner.

The function of the diverter valve 1 comprising a gap seal will be explained in more detail in the following sections:

In order to convey a material to be conveyed along the passage direction 42 or the outlet direction 41, the rotary part 6 is first arranged in the housing 2 in a sealed manner. In order to arrange the rotary part 6 in the housing 2 in a sealed manner, the rotary part 6 is pressed, by means of the axial drive 15, into the housing 2 along the axis of rotation 7 until the rotary part 6 is arranged in the housing 2 with a defined radial gap between the outer contour 9 and the inner contour 17. The radial gap is in particular between 0.01 mm and 0.5 mm, in particular between 0.02 mm and 0.3 mm, in particular between 0.03 mm and 0.2 mm, and in particular between 0.05 mm and 0.1 mm.

In this arrangement, the rotary part 6 is sealed in the housing 2 by means of the cone sealing members 16. The rotary part 6 is in a conveying position, which is also referred to as conveying arrangement. Conveying material through the passage openings 3, 5 or 4, 5 connected to one another along the passage duct 8 can be carried out in a sealed manner. In order to change the material conveying path from the passage direction 42 to the outlet direction 41 or vice versa, the rotary part 6 is rotated about the axis of rotation 7 by means of the rotary drive 23. Rotating the rotary part 6 and the axis of rotation 7 can take place in the housing 2 in the conveying arrangement of the rotary part 6. In the sealed arrangement, the rotary part 6 is rotatable about the axis of rotation 7 in the housing 2. In order to facilitate the rotation of the rotary part 6, the rotary part 6 can be pulled out of the sealed arrangement along the axis of rotation 7 in the housing 2, in other words it can be displaced towards the axial drive 15, prior to the rotary movement.

Figure 11:
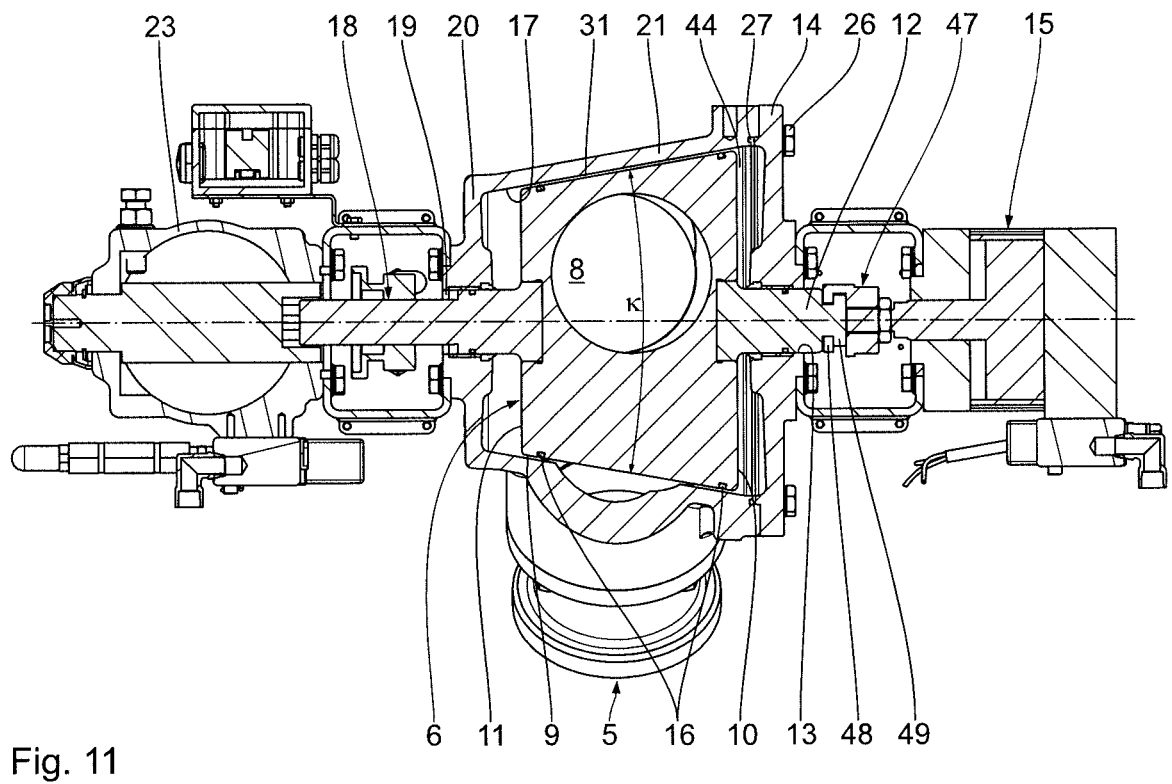
FIG. 11 shows a cross-sectional view, relative to the conveying direction, of the diverter valve in a rinsing arrangement.

In order to clean the diverter valve 1, the passage duct 8 is in particular rinsed first in the passage direction 42 and in the outlet direction 41 via the conveyor lines connected to the diverter valve 1, with the rotary part 6 in particular remaining in the conveying position. The rotary part 6 is then displaced axially along the axis of rotation 7 in the housing 2 towards the housing cover 14. The rinsing arrangement of the diverter valve 1 is shown in FIG. 11. For this purpose, the housing 2 has a clearance 44 into which the rotary part 6 can be moved with its larger front end face 10. The housing 2 remains closed during the axial displacement of the rotary part 6. It is not necessary to open the housing 2 in order to clean the diverter valve 1, in particular to rinse the rotary part 6 and the inner surfaces of the housing main body 20 and of the housing cover 14.

This axial displacement increases the radial gap between the outer contour 9 and the inner contour 17. In the cleaning arrangement or rinsing arrangement of the diverter valve 1 as shown in FIG. 11, the cleaning gap 31 has a size of approximately 1.5 mm to 2.0 mm. It is advantageous if the cleaning gap 31 has a size of 0.5 mm to 4 mm, in particular between 1.0 mm and 3.0 mm.

The cleaning gap 31 is also referred to as rinsing gap. The cleaning gap 31 ensures that cleaning liquid, which is fed into the housing 2 via the passage openings 3, 4, 5, for example, is also able to reach the surface sections of the outer contour 9 of the rotary part 6, the inner contour 17 of the housing 2 and the inner surface of the housing cover 14. The entire interior of the housing 2, in particular the gap between the outer contour 9 and the inner contour 17, can be rinsed with cleaning liquid. The cleaning arrangement shown in FIG. 11 is also referred to as rinsing arrangement, allowing depositions and inadvertent accumulations of dirt to be removed from the diverter valve 1.

FIG. 11 shows the diverter valve 1 in a mounting position in which the housing cover 14 is oriented vertically. In the arrangement shown in FIG. 11, the passage direction 42 is oriented horizontally. The outlet direction 41 is directed diagonally downwards. The conveying plane is oriented vertically. This arrangement is shown schematically in FIG. 2.

Figure 3:
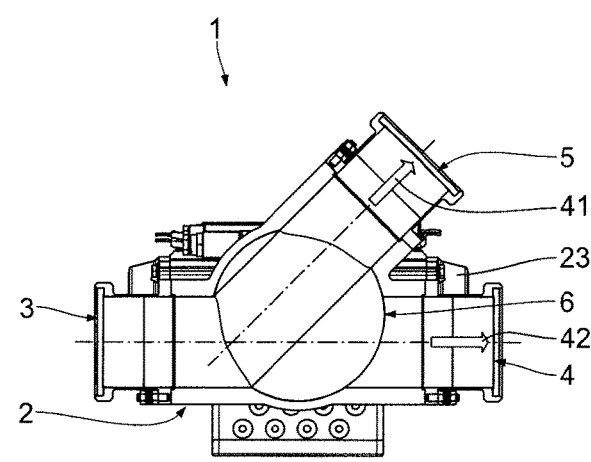
FIG. 3 shows a view, corresponding to FIG. 2, with a horizontal passage direction and an outlet towards the top.
Figure 4:
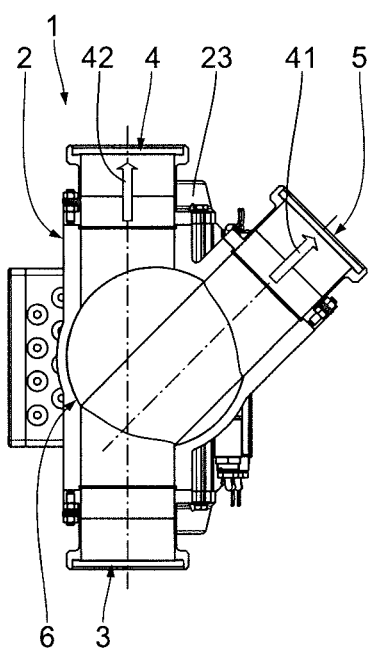
FIG. 4 shows a view, corresponding to FIG. 2, with a vertical passage direction and an outlet towards the top.
Figure 5:
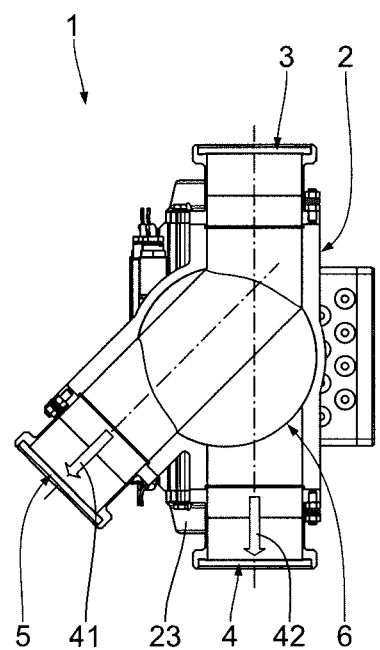
FIG. 5 shows a view, corresponding to FIG. 2, of the diverter valve with a vertical passage direction and an outlet towards the bottom.

Basically, a mounting position with horizontal passage direction 42 and an outlet direction 41 directed diagonally upwards as shown in FIG. 3 is also conceivable. In this arrangement, the conveying plane is oriented vertically as well. Correspondingly, the housing cover 14 is oriented vertically.

A mounting situation in which the passage direction 42 is oriented vertically with an outlet direction 41 directed diagonally upwards (cf. FIG. 4) or diagonally downwards (cf. FIG. 5) is also conceivable. In both cases, the conveying plane is oriented vertically. In both cases, the housing cover 14 is oriented vertically. The mounting positions described previously are the preferred mounting positions for the diverter valve. In these mounting positions, only a small amount of rinsing liquid remains in the system. These mounting positions are preferred.

The diverter valve can also be used when the housing cover 14 is oriented horizontally. It is advantageous if the housing cover 14 is arranged on the upper side of the housing 2 in a horizontal mounting position. Removing the rotary part 6, in particular for maintenance and/or cleaning, is simplified. An arrangement in which the housing cover 14 is oriented horizontally and arranged on the lower side of the housing 2 is generally also conceivable. Here, a greater amount of rinsing liquid remains in the diverter valve. These two mounting positions require a longer and more intensive drying of the diverter valve.

In the example of the diverter valve according to the invention, the mounting position and the type of seal used for the rotary part 6 in the housing 2 are independent of each other. Every possible type of seal for sealing the rotary part relative to the housing can be used in any mounting position.

Figure 12:
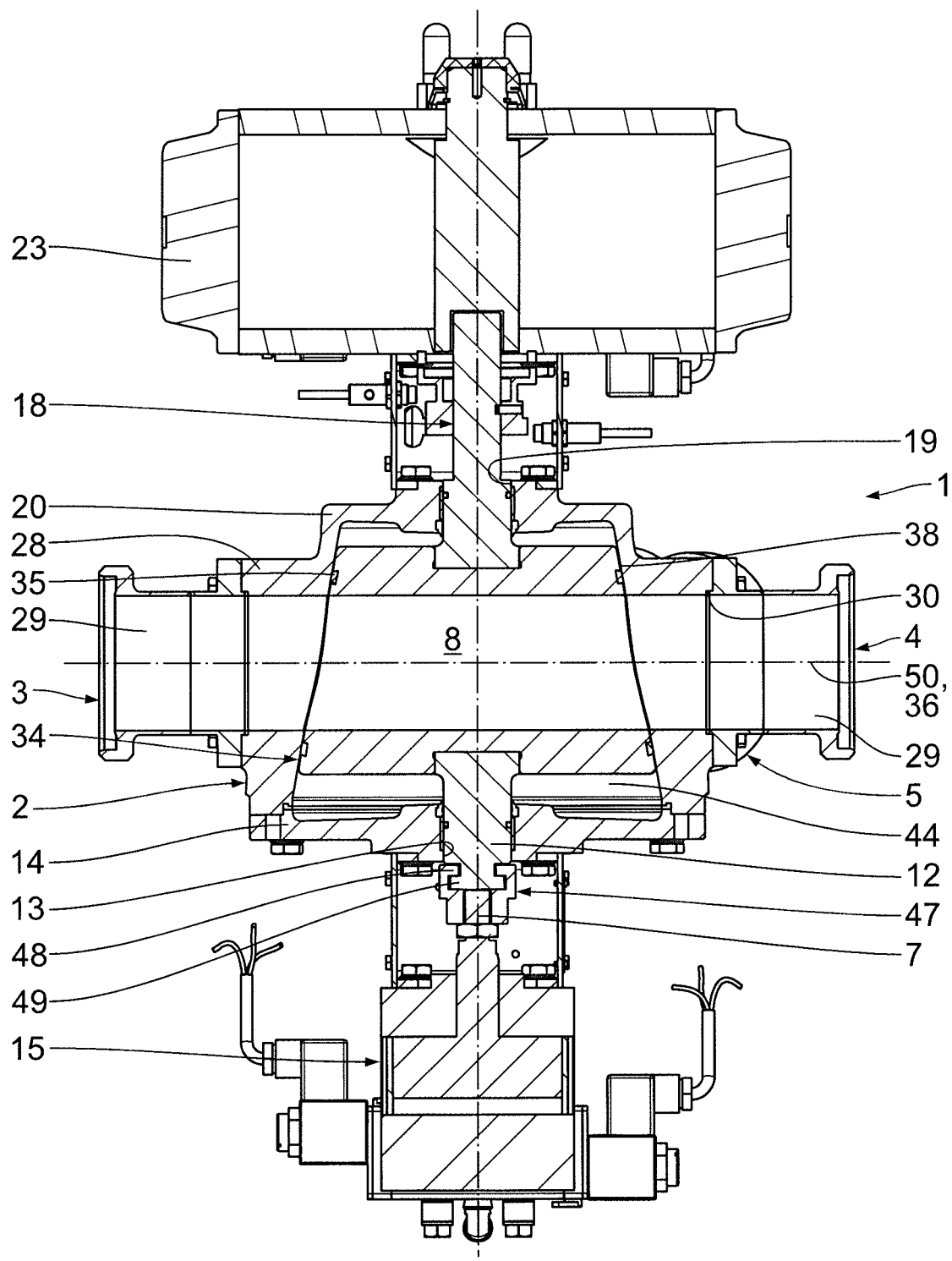
FIG. 12 shows a sectional view, corresponding to FIG. 10, of another embodiment of the diverter valve, the rotary part having passage duct sealing members.
Figure 13:
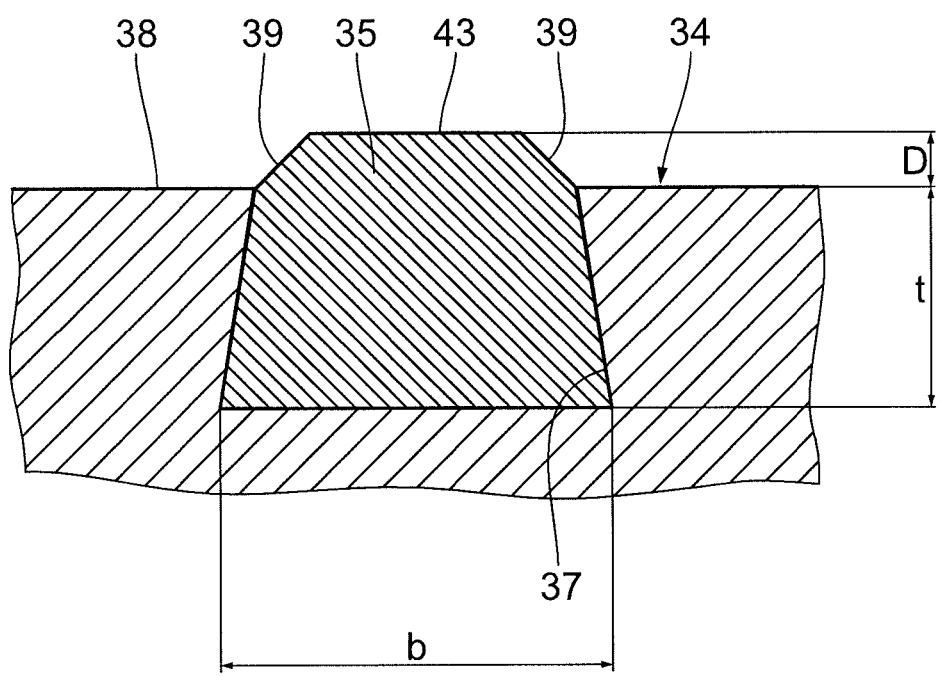
FIG. 13 shows an enlarged detail view of the passage duct sealing member as shown in FIG. 12.
Figure 14:
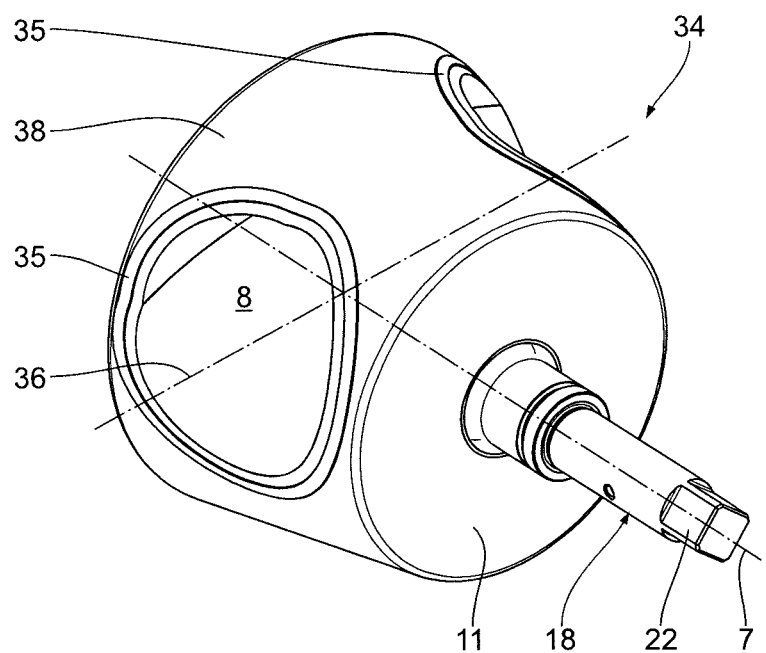
FIG. 14 shows a perspective view of a rotary part of the diverter valve as shown in FIG. 12.

The design and function of the diverter valve 1 with a seal provided on the passage duct 8 will be explained in more detail in the following sections with reference to FIGS. 12 to 14.

In this further embodiment of the diverter valve 1, the essentially annular openings of the passage duct 8 on the rotary part 34 each have a circumferential passage duct sealing member 35. The passage duct sealing members 35 are arranged circumferentially in relation to the passage duct longitudinal axis 36 on the outer contour 9 of the rotary part 34. Apart from that, the arrangement, and in particular the positioning of the rotary part 34 in the housing 2, remain essentially unchanged. An essential difference with respect to the previous embodiment is that the sealing gap between the outer contour 9 of the rotary part 34 and the inner contour 17 of the housing 2 is increased. The radial gap is in particular between 0.1 mm and 2.0 mm, in particular between 0.2 mm and 2.0 mm, in particular between 0.3 mm and 1.2 mm, and in particular between 0.4 mm and 0.8 mm. It is advantageous if the radial gap between the conical outer contour 9 of the rotary part 34 and the inner contour 17 of the housing 2 is designed with a gap space that is as small as possible. In order to ensure rotation of the rotary part 34, the rotary part 34 can be pulled out of the housing 2 axially along the longitudinal axis 7 at least along sections thereof. It is preferred if the rotary part 34 is rotated in the housing with a narrow radial gap.

As in the previous embodiment of the gap seal, the rotary part 34 with the passage duct sealing members 35 is arranged rotatably in the housing 2. It is not necessary to displace the rotary part 34 axially in the housing to ensure rotatability of the rotary part 34 about the rotary axis 7.

A special feature of the design of the passage duct sealing member 35 is that the circumferential sealing groove 37 is essentially dovetailed, in other words the groove width b increases with increasing groove depth t. In the depth direction, the groove width b increases initially in a width direction, with the result that the passage duct sealing member 35 is held reliably in the groove 37. In particular, the groove width in the region of the surface 38 of the rotary part 34 is smaller than the width of the passage duct sealing member 35 in an original condition. The passage duct sealing member 35 is biased in the groove 37 on the surface 38 and is clamped in the groove width direction.

To improve the retention of the passage duct sealing member 35 in the groove 37, the width of the passage duct sealing member may also increase with increasing groove depth t. The contour of the section of the passage duct sealing member 35 arranged in the groove 37 is essentially also dovetailed, with the width increasing at least in particular in one direction. In particular, the contour of the section of the passage duct sealing member 35 arranged in the groove 37 is essentially identical to the groove cross-section. The maximum width of the passage duct sealing member 35 is in particular greater than that of the surface 38 of the opening of the groove 37 facing the rotary part 34. The passage duct sealing member is made of an elastomer material.

According to the exemplary embodiment shown, the passage duct sealing member 35 protrudes from the groove 37 on the surface 38 of the rotary part 34. This improves a sealing effect of the passage duct sealing member 35. According to the exemplary embodiment shown, the protrusion D relative to the surface 38 is in particular between 0.5 mm and 1.0 mm. The cross-sectional shape of the passage duct sealing member 35 is essentially rectangular, with the protruding section of the passage duct sealing member 35 protruding from the groove 37 having lateral transition chamfers 39. The transition chamfers 39 improve the sealing effect against the rotary part 34. The transition chamfers 39 enable a continuous transition from the surface 38 of the rotary part 34 to the surface 43 of the passage duct sealing member 35.

In order to rinse the diverter valve 1 comprising passage duct sealing members 35, the rotary part 34 is axially displaced in the housing 2 as in the previous embodiment until the rinsing gap is obtained. As the passage duct sealing members 35 protrude from the outer contour 9 of the rotary part 34, the rinsing gap is—in this embodiment—defined as the distance between the inner contour 17 of the housing 2 and the passage duct sealing members 35. The rinsing gap defined in this manner is—in this embodiment—identical to the rinsing gap of the diverter valve 1 comprising a gap seal.

Figure 15:
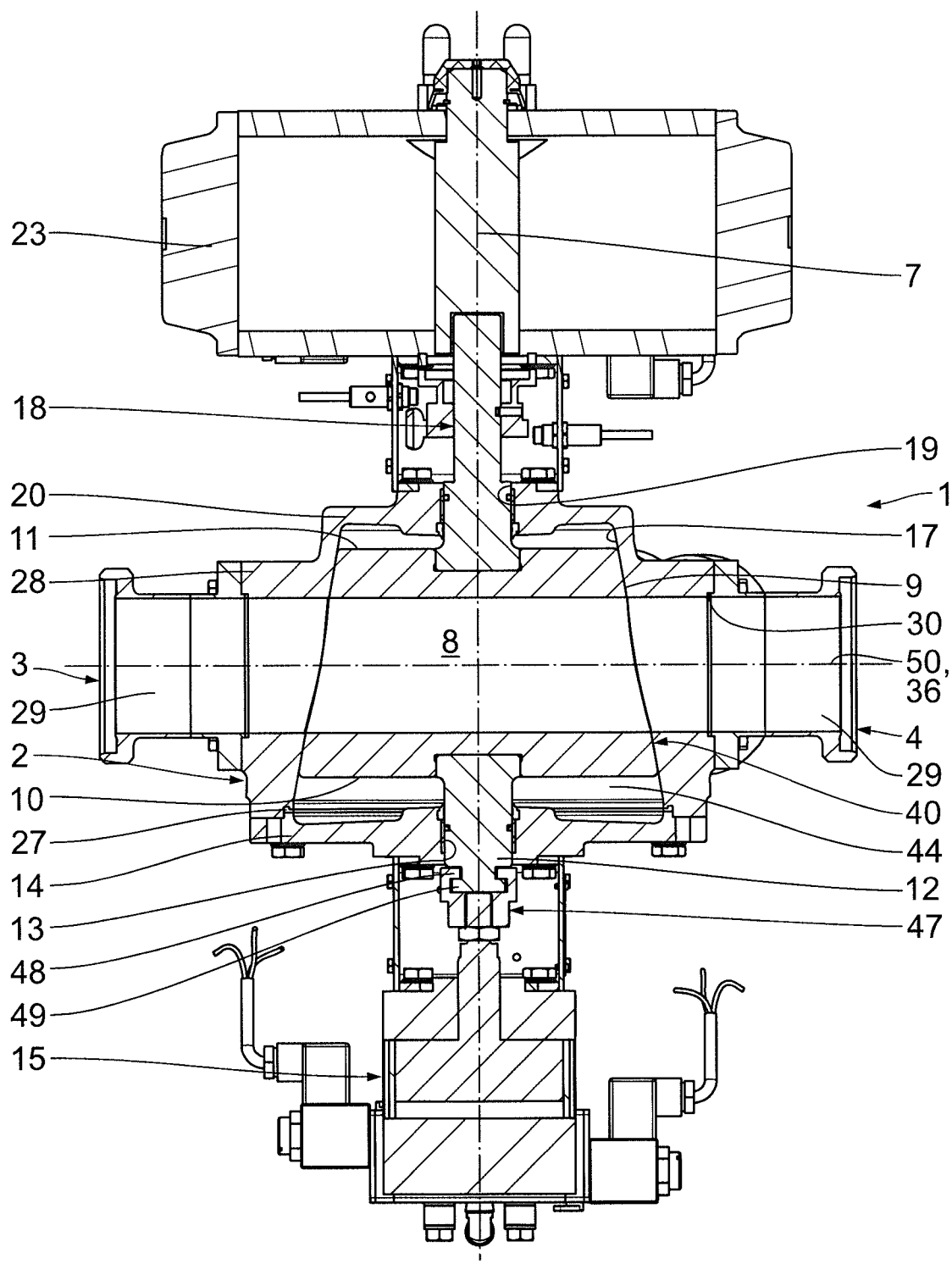
FIG. 15 shows a view, corresponding to FIG. 10, of a diverter valve according to another embodiment where the rotary part is in direct contact, with its outer contour, with an inner contour of the housing.

The design and function of another embodiment of a diverter valve without radial gap will be explained in the following sections with reference to FIG. 15.

In this embodiment of the diverter valve 1, the rotary part 40 is designed without sealing member according to the exemplary embodiment shown. A sealing of the rotary part 40 in the housing 2 is brought about in such a way that the rotary part 40 is in direct contact, with its conical outer contour 9, with the conical inner contour 17 of the housing 2, in other words the rotary part 40 is in full contact with the housing 2. In this arrangement, there is no radial gap or the radial gap is 0 mm. For this embodiment, it is advantageous if at least one of the surfaces resting against one another has a particular surface treatment and, in particular, has a surface refinement, in particular has a particular surface hardness. It is also possible to apply a hardening layer to the surfaces of both components, i.e. of the housing 2 and of the rotary part 40. It is advantageous if the surfaces have a hardening layer configured as a chromium layer. It is advantageous if only the surface of the rotary part 40 is designed with the chromium layer.

It is conceivable to provide a cone sealing member 16 configured as an O-ring in addition to the full-contact arrangement on the outer contour of the rotary part 40.

In order to rotate the diverter valve configured such that the rotary part 40 thereof is in full contact with the housing, it is necessary to remove the rotary part 40 from the housing 2. This can be done, for example, by a comparatively small axial displacement of a few tenths of a millimeter up to some millimeters. The slight axial displacement of the rotary part 40 can be carried out when the pneumatic lifting drive, i.e. the axial drive 15 is depressurized. By means of a plate spring not shown, which is mounted in a biased condition, the rotary part 40 is lifted off the conical internal contour 17 of the housing 2.

In the lifted-off arrangement of the rotary part 40, said rotary part 40 can be rotated for example between the passage arrangement and the outlet arrangement.

In this arrangement, the rotary part 40 can, however, also be rotated about the axis of rotation 7 to scrape off and discharge product that has deposited there. In order to perform the actual rinsing, the rotary part 40 is pulled out of the housing 2 further along the axis of rotation 7 until a larger, defined rinsing gap is formed.

Another axial displacement is performed by the axial drive 15, by activating, i.e. operating the latter.

Instead of the biased plate spring, it is also possible to use an axial drive 15 configured as two pneumatic cylinders connected in series.

Axially displacing the rotary part 40 can also take place in a single stage, a relief member for depressurizing the axial drive 15 in particular being omitted. Rotating and cleaning the rotary part 40 is then performed in a condition of maximum axial displacement, i.e. in the rinsing arrangement.

Figure 16:
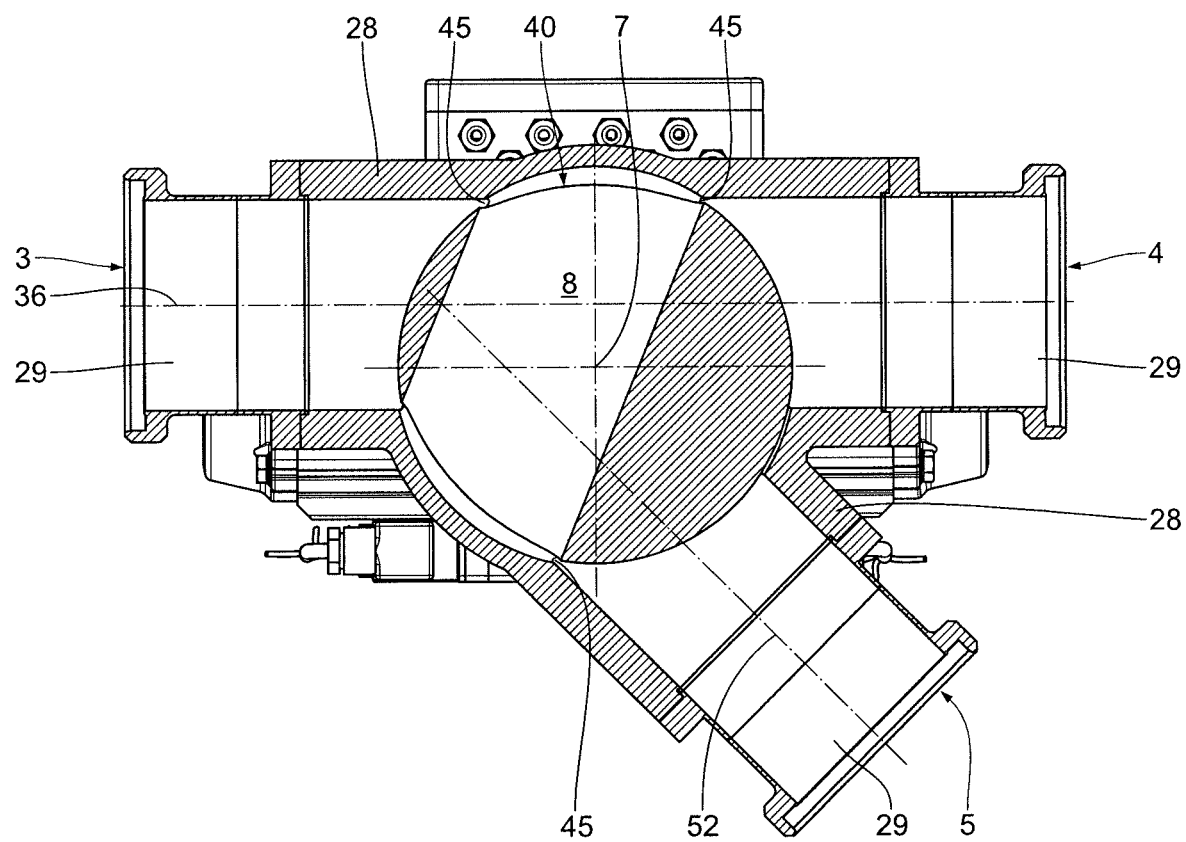
FIG. 16 shows a sectional view, corresponding to FIG. 2, of a diverter valve with the rotary part in an intermediate rotary position for cleaning with a large axial gap in a CIP rinsing position.

The function, in particular the rinsing of a diverter valve will be explained in more detail in the following sections with reference to FIG. 16. As shown in FIG. 16, the rotary part 40 is in the axially displaced condition. Additionally, the rotary part 40 has been rotated about the longitudinal axis 7, in other words it is neither in the passage arrangement nor in the outlet arrangement but in a rinsing rotary position in which the passage duct 8 faces none of the passage openings 3, 4, 5. In particular, the greatest part of the first passage opening 3 and the pipe section connected thereto are blocked by the rotary part 40. Rinsing water, which is pressed into the lateral cover area through the gaps between rotary part and housing, flows through said lateral cover area intensively. The rinsing water is then flushed, via additional gaps, into one of the discharging pipe sections connected to the passage openings 4 and/or 5. It is advantageous that the rotary drive 23 of the diverter valve 1 enables the rinsing position of the rotary part 40 with a third central position.

When the position of the rotary part is changed during rinsing, the cleaning liquid is flushed into all areas of the housing, thus allowing all accumulations of dirt or old product to be removed.

In order to dry the diverter valve, in particular the rotary part 40, the rotary drive 23 can be moved into the central position shown in FIG. 16. In order to accelerate the drying process, the rotary part can also be moved axially to generate a sufficiently turbulent flow, and in particular to dry all areas of the diverter valve 1 and of the rotary part 40 safely and to remove larger amounts of rinsing water from potential dead zones. The air speed in the diverter valve must be selected such that water is blown off. This air speed is between 15 m/s and 40 m/s, preferably between 25 m/s and 30 m/s, in the pipeline. Correspondingly higher air speeds will then develop in the gaps, allowing any water that has accumulated there to be carried away safely for a fast drying result.

It is conceivable for the housing bottom 20 to be designed in a planar manner. It is conceivable for a collecting trough to be integrated in the housing bottom 20, which—as shown in the sectional view of FIG. 15—has a essentially v- or u-shaped design. The shape of the housing bottom 20 depends in particular on the mounting position of the diverter valve 1.

Figure 17:
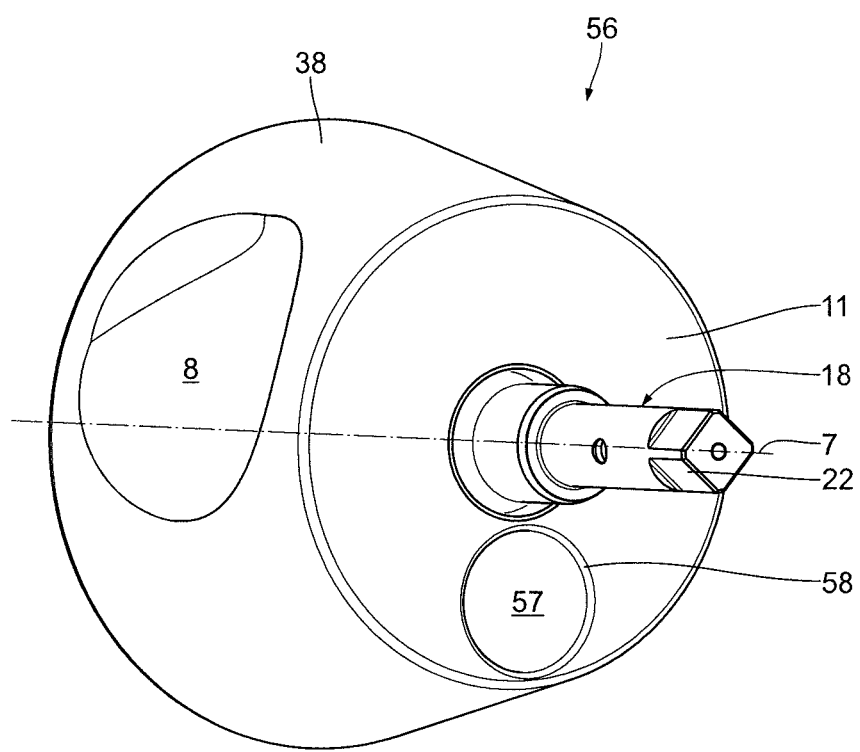
FIG. 17 shows a perspective view of a rotary part with a breakthrough.
Figure 18:
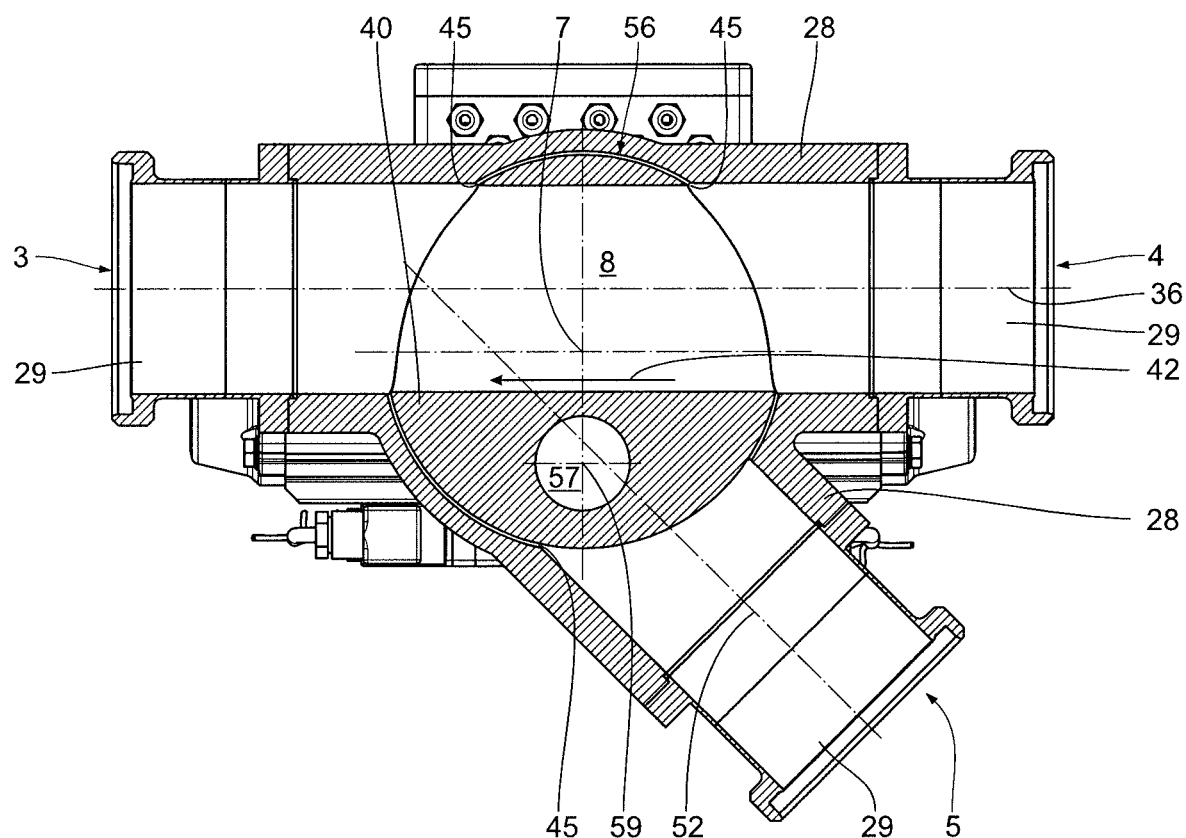
FIG. 18 shows a sectional view of a diverter valve with the rotary part as shown in FIG. 17.

Another embodiment of a diverter valve will be explained in the following sections with reference to FIGS. 17 and 18.

The rotary part 56 essentially corresponds to the rotary part 40 of the previous embodiment, with an additional breakthrough 57 being provided. The breakthrough 57 is essentially cylindrical and has chamfers 58 on the transitions facing the front end faces 10, 11 of the rotary part 56. The breakthrough 57 has a breakthrough longitudinal axis 59, which is oriented parallel to the longitudinal axis 7 of the diverter valve 53. The breakthrough 57 reduces the mass of the rotary part. Also, it improves the rinsing of the diverter valve 53, in particular in the area of the lateral surfaces. What is essential is that the breakthrough 57 extends from at least one of the front end faces 10, 11 of the rotary part 56. It is also conceivable to provide a recess configured in the manner of a blind hole instead of the breakthrough, said blind hole extending along the breakthrough longitudinal axis 59 without penetrating the entire rotary part 56.

The breakthrough longitudinal axis 59 can be arranged at an angle of inclination relative to the longitudinal axis 7. This angle of inclination can amount to up to 20°.

The breakthrough longitudinal axis 59 is oriented in particular perpendicular to the passage duct longitudinal axis 36. The passage duct longitudinal axis 36 and the breakthrough longitudinal axis 59 are oriented in a screw configuration such that the passage duct 8 and the breakthrough 57 run separately from one another in the rotary part 56. The breakthrough 57 is integrated in the rotary part 56 at a distance from the passage duct 8. The passage duct 8 and the breakthrough are not connected to one another. The breakthrough 57 is a relief bore.

When cleaning the diverter valve 53 using a liquid, the breakthrough 57 improves the cleaning result. As soon as liquid, in particular water, escapes through one of the lateral discharge openings of the breakthrough 57, the front ends of the rotary part 56 are flushed more intensively.

Figure 19:
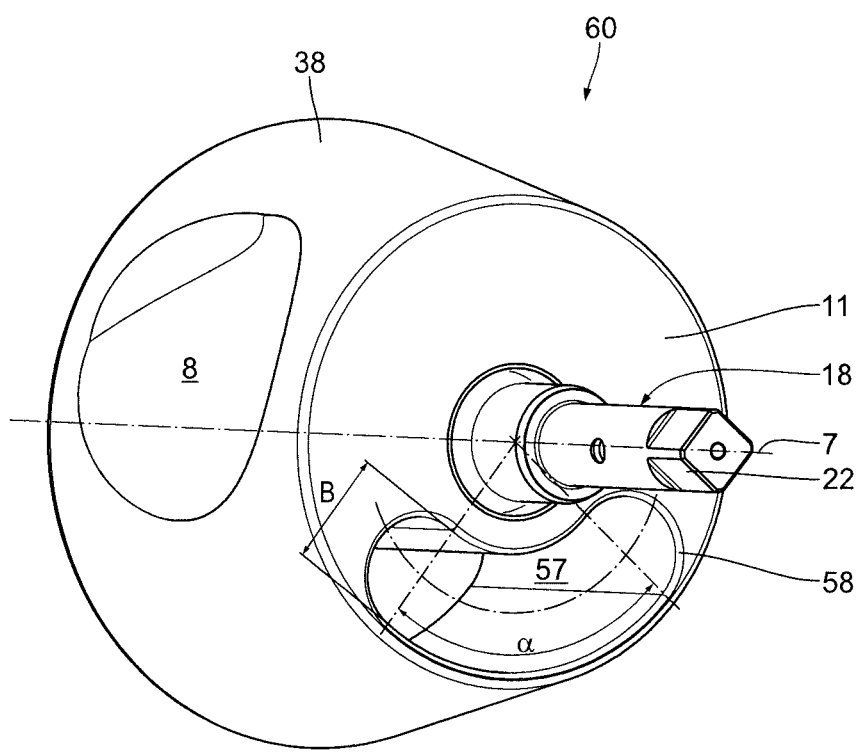
FIG. 19 shows a view, corresponding to FIG. 17, of a rotary part according to another embodiment with a kidney-shaped breakthrough.

Another embodiment of a rotary part 60 will be explained in the following sections with reference to FIG. 19. The rotary part 60 essentially corresponds to the rotary part 56, with the breakthrough 57 being formed in the manner of an elongate hole along a circular arc. The opening angle α of the circular arc in relation to the longitudinal axis 7 is 90° in the exemplary embodiment shown. The opening angle α may also be greater than 90° or smaller than 90°. The width B of the elongate hole is half the radius of the smaller front end face 11 in the exemplary embodiment shown. The width B of the elongate hole can also be selected greater or smaller. It is advantageous if the breakthrough 57 is as large as possible to reduce the mass of the rotary part 60 to the greatest possible extent. When designing the breakthrough 57, great care must be taken to ensure that the breakthrough 57 and the passage duct 8 do not intersect one another. The stability and rigidity of the rotary part 60 is ensured despite the breakthrough 57.

Figure 20:
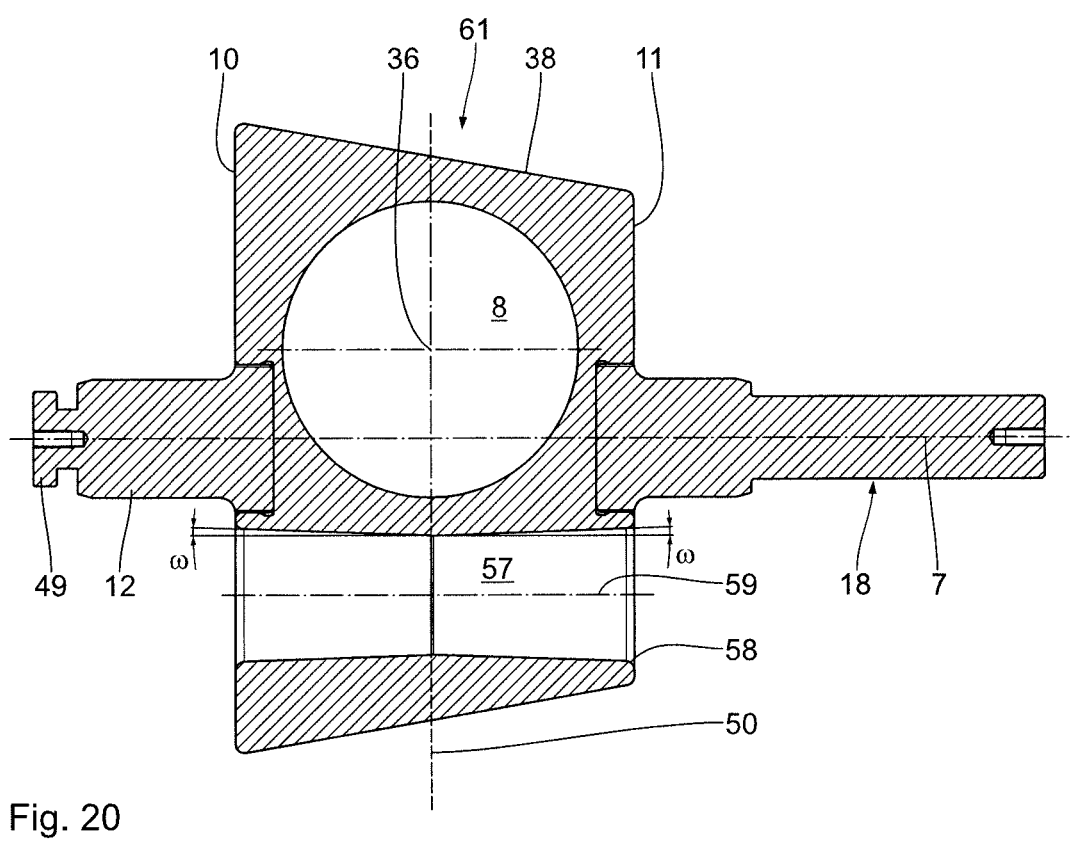
FIG. 20 shows a sectional view of a rotary part according to another embodiment with a double-conical breakthrough.

Another embodiment of a rotary part 61 will be explained in the following sections with reference to FIG. 20.

The rotary part 61 essentially corresponds to the rotary part 56 of the previous exemplary embodiment. The most important difference is that the breakthrough 57 has a double-conical design. Starting from the openings arranged respectively at the front end faces 10, 11, the breakthrough 57 tapers at a breakthrough cone angle ω. In the exemplary embodiment shown, the breakthrough cone angle ω is 1°. The breakthrough cone angle ω can however also be selected greater or smaller than 1°. It is advantageous if the breakthrough cone angle ω in the breakthrough 57 facilitates an automatic outflow of cleaning liquid from the breakthrough towards the front end faces 10, 11.

The double-conical design of the breakthrough 57 is symmetrical. This means that the cone sections of the breakthrough 57 meet in the longitudinal center plane 50 in which the passage duct longitudinal axis 36 is disposed as well. In particular, the two breakthrough cone angles co of the cone sections of the breakthrough 57 are identical. It is also conceivable that the depths of the cone sections of the breakthrough 57 are different from one another such as to meet in particular outside the longitudinal center plane 50. The breakthrough cone angles co can also be defined differently.

Figure 21:
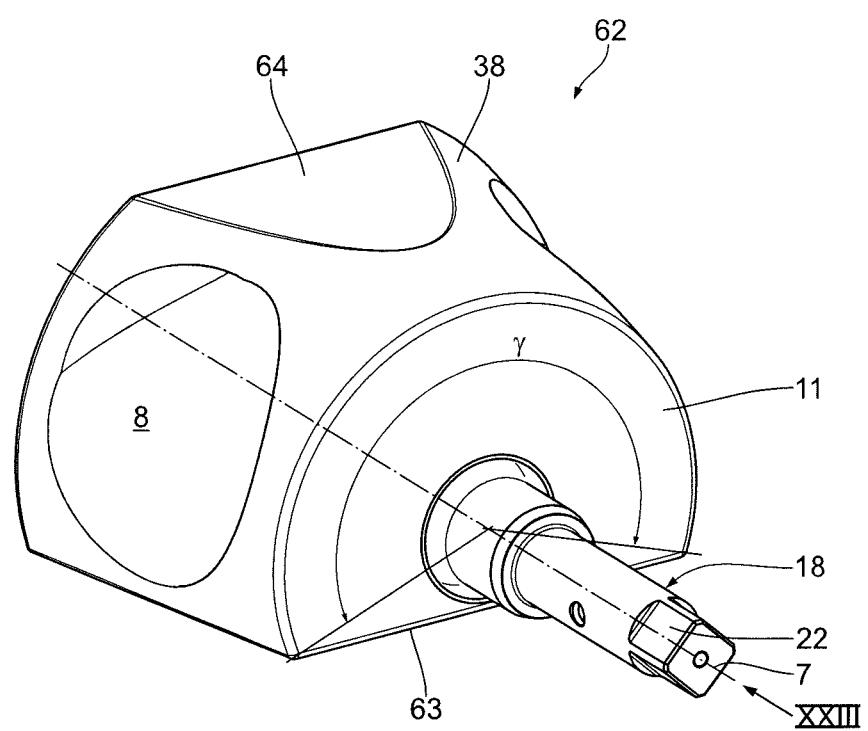
FIG. 21 shows a view, corresponding to FIG. 19, of a rotary part according to another embodiment configured as a segment component.
Figure 22:
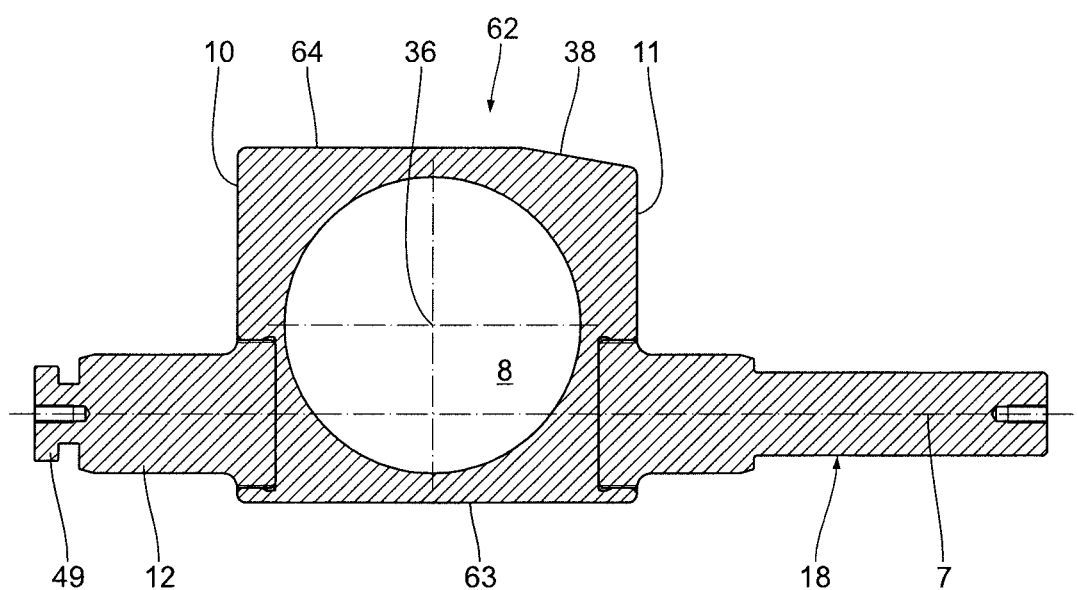
FIG. 22 shows a sectional view of the rotary part as shown in FIG. 21.
Figure 23:
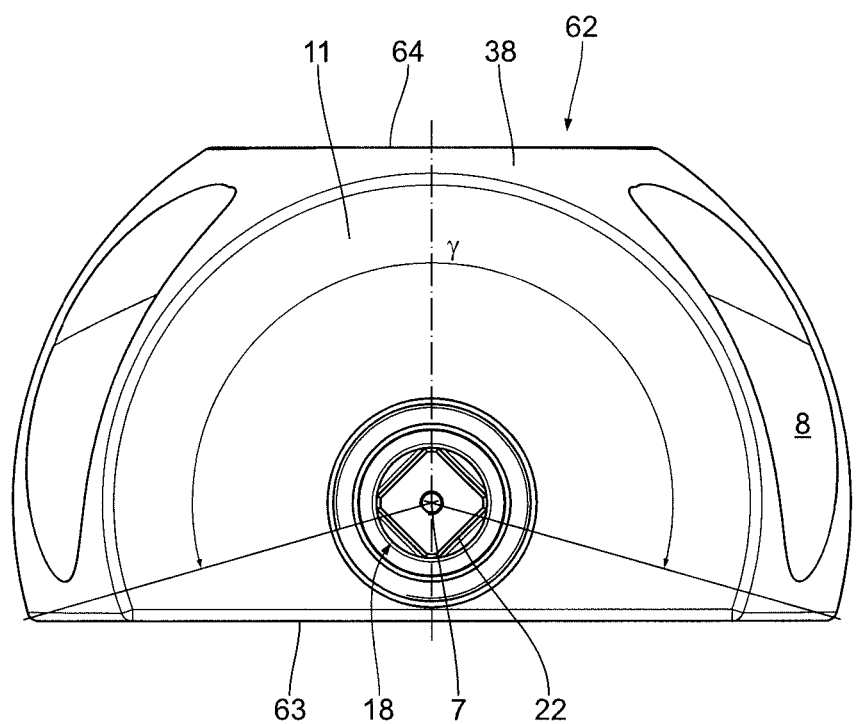
FIG. 23 shows a view of the rotary part in FIG. 21 according to arrow XXIII.

Another embodiment of a rotary part 62 will be explained in the following sections with reference to FIGS. 21 to 23. The most important difference with respect to the previous embodiments is that the outer contour 9 of the rotary part 62 is not conical over the entire circumference. The outer contour extends across an opening angle γ relative to the longitudinal axis 7, the opening angle γ being greater than 180°. In the exemplary embodiment shown, the opening angle γ is 200°.

The rotary part 62 corresponds to a segment of a cone. The outside 63 of the rotary part 62, which is not visible in FIG. 21, is planar. The surface opposing the outside 63 is straightened in sections. The straightened section 64 is parallel to the outside 63.

Figure 24:
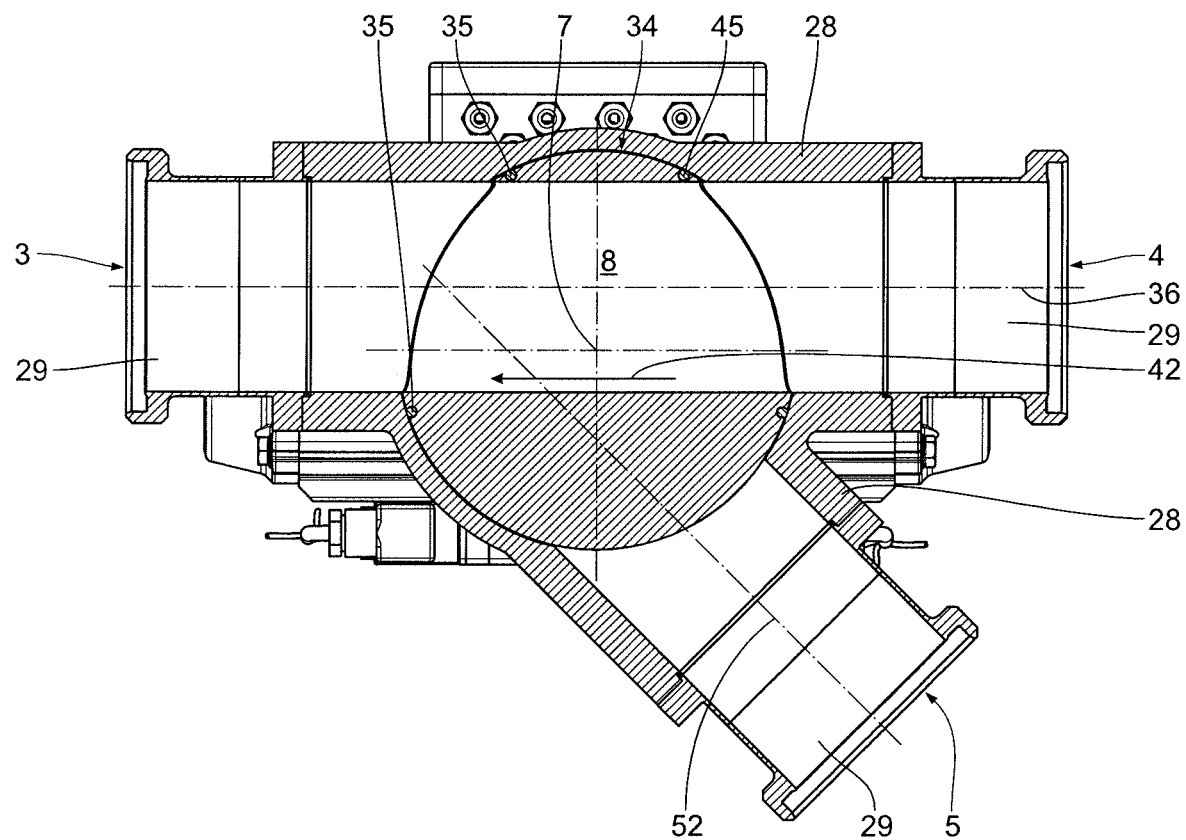
FIG. 24 shows a view, corresponding to FIG. 9, of a diverter valve according to another embodiment with passage duct sealing members configured in another way.
Figure 25:
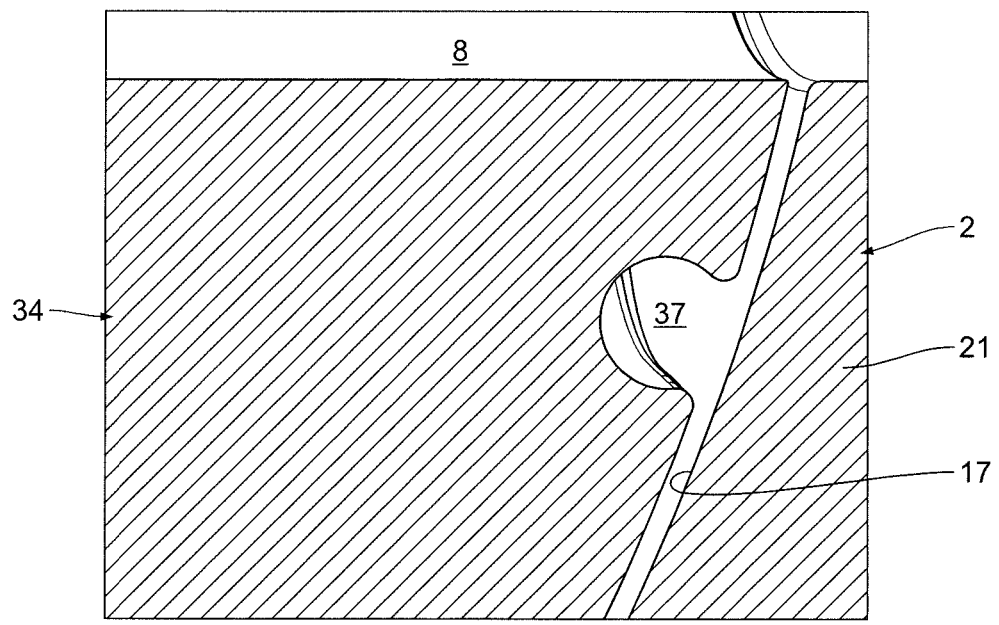
FIG. 25 shows an enlarged sectional view of a sealing groove of the diverter valve as shown in FIG. 24.
Figure 26:
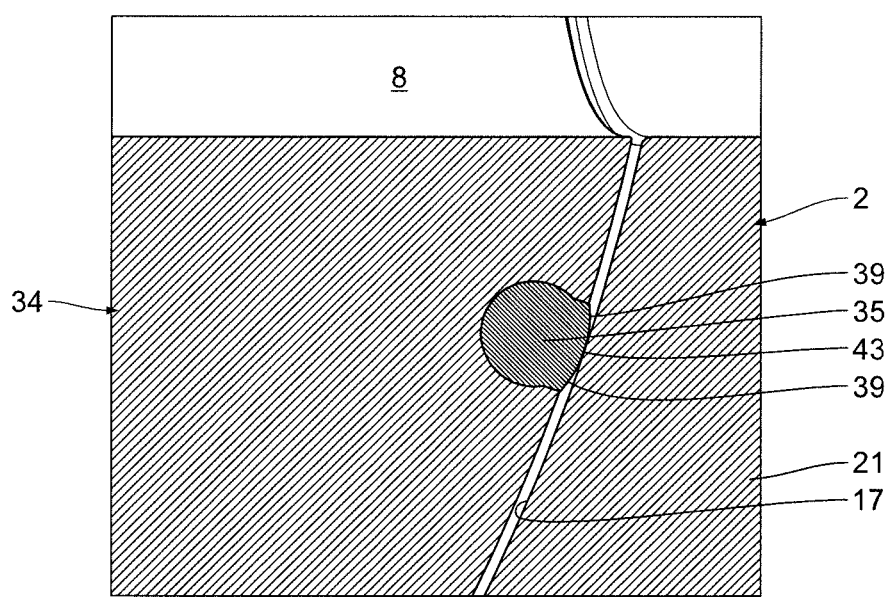
FIG. 26 shows an enlarged sectional view, corresponding to FIG. 25, with the passage duct sealing member being inserted.

Another embodiment of a diverter valve will be explained in the following sections with reference to FIGS. 24 to 26.

The passage duct sealing member 35 of the diverter valve 1 is essentially configured as an O-ring, which is arranged in a corresponding sealing groove 37. The cross-sectional shape of the passage duct sealing member 35 and the contour of the sealing groove 7 correspond to one another, with the result that the sealing groove 37 is completely filled by the passage duct sealing member 35. Dead zones are avoided.

The passage duct sealing member 35 has a protruding section, which comprises two transition chamfers 39 that meet in an essentially linear surface 43. The linear surface 43 forms a contact edge of the passage duct sealing member 35 on the inner contour 17 of the housing 2.

Figure 27:
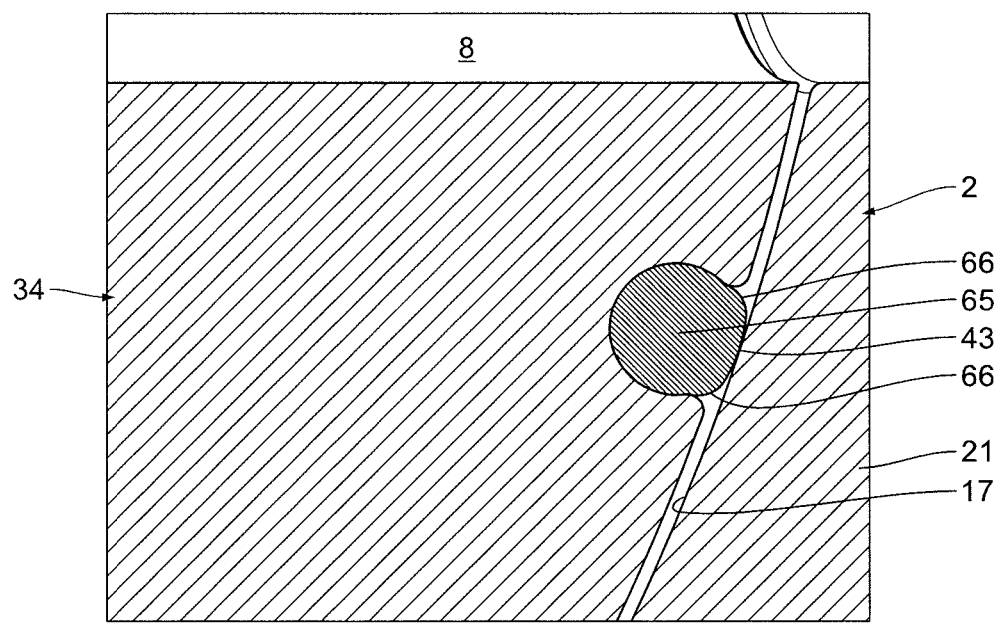
FIG. 27 shows a view, corresponding to FIG. 26, of another embodiment of the passage duct sealing member.

Another embodiment of the passage duct sealing member will be explained in the following with reference to FIG. 27. Just like the embodiment of FIG. 26, the passage duct sealing member 65 is designed essentially in the manner of an O-ring. The only difference is that the protruding section has transition curvatures 66 instead of the transition chamfers, the transition curvatures 66 providing a transition to an essentially planar surface 43. The contact surface between the surface 43 of the passage duct sealing member 65 and the inner contour 17 of the housing 2 is thus increased.

What is claimed is:

1. A diverter valve for conveying material to be conveyed, comprising:
    a housing with at least three passage openings to one of feed and discharge the material to be conveyed, the passage openings defining a conveying plane,
    a rotary part having a rotary axis and an outer contour designed conically at least in sections relative to the axis of rotation, the rotary part being arrangeable in the housing in a sealed manner, the rotary part being displaceable along the axis of rotation in an axially driven manner and being arranged such as to be drivable for rotation about the axis of rotation, the axis of rotation being oriented perpendicular to the conveying plane, and
    a passage duct arranged in the rotary part, the passage duct connecting, depending on a rotary position of the rotary part, in each case two passage openings to convey material to be conveyed through the diverter valve along the passage duct, and
    passage duct sealing members arranged circumferentially on the rotary part in relation to a passage duct longitudinal axis, wherein the passage duct sealing members are each retained in a sealing groove of the rotary part in such a way as to be clamped against a surface of the rotary part, wherein the passage duct sealing members protrude from the outer contour of the rotary part with a protruding section, wherein the protruding section has at least one transition chamfer for a smooth transition of the surfaces of the rotary part and the passage duct sealing member.

2. The diverter valve as claimed in claim 1, comprising a rotary drive for rotatably displacing the rotary part about the axis of rotation, the rotary drive enabling a central position of the rotary part.

3. The diverter valve as claimed in claim 1,
    wherein a cone angle of the outer contour of the rotary part is between 10° and 40°.

4. The diverter valve as claimed in claim 1, wherein the rotary part is in direct contact, with its outer contour, with the inner contour of the housing.

5. The diverter valve as claimed in claim 1, further comprising:
    cone sealing members arranged circumferentially on the rotary part in relation to the axis of rotation, the passage duct being arranged between the cone sealing members in relation to the axis of rotation.

6. The diverter valve as claimed in claim 1, wherein the passage duct sealing members are each retained in a sealing groove of the rotary part in such a way as to be clamped against a surface of the rotary part without gaps.

7. The diverter valve as claimed in claim 1, wherein the passage duct sealing members are each retained in the corresponding sealing groove in a form-fitting manner.

8. The diverter valve as claimed in claim 1, wherein the transition chamfer is circumferential.

\* \* \* \* \*